(12) United States Patent
Koirala et al.

(10) Patent No.: US 11,330,025 B1
(45) Date of Patent: May 10, 2022

(54) STREAMLINED PROVISIONING FOR TELECONFERENCING ENDPOINTS

(71) Applicant: PLANTRONICS, INC., Santa Cruz, CA (US)

(72) Inventors: Dipesh Koirala, Austin, TX (US); Subrahmanya Srinivasulu Hari, Leander, TX (US); Krishna Balusu, Round Rock, TX (US); Joseph Samuel, Cedar Park, TX (US); Peter Tao, Dripping Springs, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 16/949,086

(22) Filed: Oct. 13, 2020

Related U.S. Application Data

(60) Provisional application No. 62/914,515, filed on Oct. 13, 2019.

(51) Int. Cl.
  *H04L 29/06* (2006.01)
  *H04L 65/403* (2022.01)

(52) U.S. Cl.
  CPC ............................. *H04L 65/403* (2013.01)

(58) Field of Classification Search
  USPC ........................................................ 370/260
  See application file for complete search history.

(56) References Cited

U.S. PATENT DOCUMENTS 9,584,518 B1 * 2/2017 Robertson ........... H04L 63/0823
2017/0195327 A1 * 7/2017 Lee ....................... H04L 63/104

* cited by examiner

*Primary Examiner* — Amal S Zenati
(74) *Attorney, Agent, or Firm* — Ramey LLP; Jacob B. Henry, Esq.

(57) ABSTRACT

A system which automatically provisions teleconferencing equipment with virtually all necessary settings is provided. The need for end users to spend time manually configuring such equipment to use the services of a teleconferencing service provider is, in most cases, eliminated.

20 Claims, 11 Drawing Sheets

STREAMLINED PROVISIONING FOR TELECONFERENCING ENDPOINTS

CROSS-REFERENCE TO RELATED APPLICATION

This application claims priority benefit of U.S. Provisional Application No. 62/914,515 filed Oct. 13, 2019 and entitled ZERO-TOUCH ONBOARDING PERSONAS. U.S. Provisional Application No. 62/914,515 is entirely incorporated by reference herein.

TECHNICAL FIELD

This disclosure relates generally to teleconferencing and relates particularly to systems and methods for remotely provisioning teleconferencing endpoints and devices prior to use, based on the individualized needs of the user.

BACKGROUND

During a real-time videoconference, people at a teleconferencing (e.g., videoconferencing) endpoint interact with people at one or more other teleconferencing endpoints over a network using one or more teleconferencing devices. Frequently however, before the conference can occur, such teleconferencing devices must be configured for the specific endpoints where they will be used. Attempts to provide teleconferencing devices requiring little or no configuration by the endpoint user have not been wholly successful. Thus, there is room for improvement in the art.

SUMMARY

An example of this disclosure is a method of provisioning teleconferencing endpoints. The method includes: providing a teleconferencing device (TD); allocating a media access control address and a serial number to the TD; receiving, at one or more processors, order information corresponding to the TD; associating, using the one or more processors, a unique telepresence identification code with the TD based on the order information, the unique telepresence identification code corresponding to a teleconferencing service provider (TSP) and one or more communications settings of the TSP; and configuring, using the one or more processors, the TD to perform various operations. The various operations include: attempting to retrieve, through a network, the one or more communications settings of the TSP from one or more provisioning servers based on the unique telepresence identification code and the serial number of the TD, when the TD is coupled to the network; Installing the one or more communications settings of the TSP when retrieved from the one or more provisioning servers; and attempting to communicate with the TSP, wherein attempting to communicate with the TSP comprises attempting to communicate with the TSP through the network in accordance with the one or more communications settings of the TSP, based on the media access control address of the TD.

Another example of this disclosure is a teleconferencing device (TD) having a media access control address, wherein the TD is configured to: attempt to retrieve, through a network, one or more communications settings of a TSP from one or more provisioning servers based on a unique telepresence identification code and a serial number assigned to the TD, when the TD is coupled to the network; and install the one or more communications settings of the TSP when retrieved from the one or more provisioning servers; attempt to communicate with the TSP, wherein attempting to communicate with the TSP comprises attempting to communicate with the TSP through the network in accordance with the one or more communications settings of the TSP, based on the media access control address.

In another example of this disclosure, a teleconferencing provisioning system comprises one or more processors and at least one memory storing instructions executable by the one or more processors, wherein the instructions comprise instructions to: allocate a media access control address and a serial number to a teleconferencing device (TD); receive order information corresponding to the TD; associate a unique telepresence identification code with the TD based on the order information, the unique telepresence identification code corresponding to a TSP and one or more communications settings of the TSP; and configure the TD to: attempt to retrieve, through a network, the one or more communications settings of the TSP from one or more provisioning servers based on the unique telepresence identification code and the serial number of the TD, when the TD is coupled to the network; install the one or more communications settings of the TSP when retrieved from the one or more provisioning servers; and attempt to communicate with the TSP, wherein attempting to communicate with the TSP comprises attempting to communicate with the TSP through the network in accordance with the one or more communications settings of the TSP, based on the media access control address of the TD.

BRIEF DESCRIPTION OF THE DRAWINGS

For illustration, there are shown in the drawings certain examples described in the present disclosure. In the drawings, like numerals indicate like elements throughout. The scope of the inventions disclosed is not limited to the precise arrangements and instruments shown.

DETAILED DESCRIPTION

Figure 1:
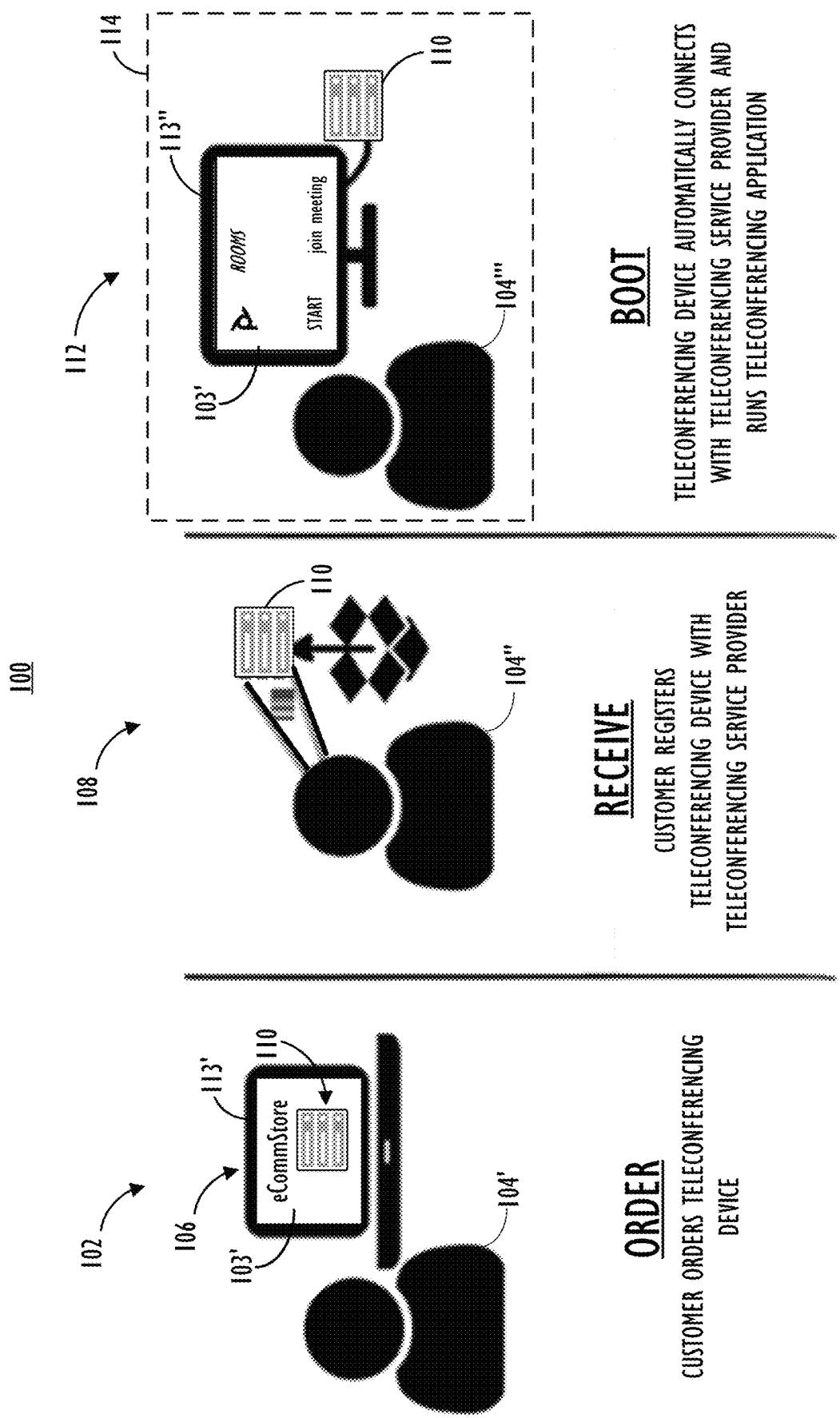
FIG. 1 illustrates a process for provisioning a teleconferencing device, in accordance with an example of this disclosure.

In the drawings and related description, certain terminology is used for convenience and is not to be taken as limiting the examples of the present disclosure.

Conventionally, teleconferencing devices have required manual configuration by an information technology administrator to allow such devices to interact with a teleconferencing service, such as a cloud-based video-conferencing service (e.g., Zoom™, Microsoft Teams™, Cisco Webex™, etc.) in an optimal manner. Aspects of this disclosure obviate or minimize the need for such manual configuration by the end user.

Aspects of this disclosure are directed towards systems and methods which provide a user with a teleconferencing device (TD) that is ready to operate as soon as the TD is installed at an endpoint. In accordance with one or more examples of this disclosure, when a TD is activated for the first time, the TD will immediately allow a user to make calls and join and/or initiate teleconferences with little or no configuration by the user.

Aspects of this disclosure pertain to an internet protocol-based platform, (e.g., an ecosystem), maintained by a teleconferencing service provider (TSP) through which meeting participants collaborate using one or more of the platform's video conferencing, teleconferencing, and/or chat functionalities. Aspects of this disclosure also pertain to one or more applications and communications settings, (e.g., a persona), for a TD which enable the TD to use services of the TSP (e.g., Challo™). In various examples of this disclosure, such applications and communications settings enable the TD to operate within an ecosystem in a particular manner. In at least one example, for a given TD, each TSP's network requires its own persona to be installed on the TD for the TD to be able to properly send and receive communications using the services of the TSP (e.g., Google Meet™). In some examples, a TD is provided with a persona based on the needs of the intended user(s). For example, a user who desires to use a Zoom ecosystem will receive a TD that can natively dial and receive Zoom calls and otherwise access the Zoom ecosystem without the user having to install a teleconferencing application or otherwise configure the settings of the TD. Aspects of this disclosure ensure that a correct persona is loaded and configured on the TD when the TD is initialized. In some examples of this disclosure, personas are not installed on TDs at the time of their manufacture, but instead have a persona installed once the needs of the user become known, as will be explained in greater detail below.

FIG. 1 illustrates a process 100 for provisioning a TD 110, in accordance with an example of this disclosure. The process 100 includes three phases. In the order phase 102, a user (purchaser) 104 orders 106 one or more TD(s) 110 from a vendor, such as through a user interface 103 at a computer 113. In the receive phase 108, a user (customer) 104 receives the TD(s) 110. The user 104 can reference each received TD 110 with a serial number and a corresponding teleconferencing application (e.g., Convene Meetings™) to determine where to physically place the TD 110 (e.g., to which teleconferencing endpoint the TD 110 has been assigned). For example, a serial number may be cross-referenced against a teleconferencing endpoint at a physical location intended for the specific TD 110 bearing the serial number.

As will be explained in greater detail, each TD 110 can come preconfigured with settings and functionalities which are suitable for the TD's intended teleconferencing endpoint. Additionally, each TD 110 received can arrive preconfigured to acquire (retrieve) one or more (additional) settings and functionalities which are suitable for the TD's intended teleconferencing endpoint. The teleconferencing endpoint may correspond to a location designated by the purchaser (104) when the user ordered 106 the TD 110. In some examples of this disclosure, a TD 110 will be received by a user 104 in a state in which the TD 110 is configured to automatically retrieve all such customized settings (such as from one or more remote servers) when the TD 110 is first powered on.

In the boot phase 112, a user 104 places the TD(s) 110 in the location(s) (e.g., meeting room(s)/teleconferencing endpoint(s) 114) for which the teleconferencing application(s) and settings have been pre-established, and connects the TD 110 to an intermediate network (between the TD 110 and the TSP's network). In some examples, when the user 104 connects the TD 110 to the intermediate network (such as through a computer 113), the user 104 is automatically connected to the TSP and is logged into a teleconferencing network of the TSP (e.g., Click Meeting™). In some examples, when the user 104 connects the TD 110 to an intermediate network, the TD 110 will automatically retrieve its preconfigured customized settings from one or more remote servers before connecting to the teleconferencing network of the TSP. (See e.g., FIGS. 2-4) The user 104 is thus relieved of the burden of configuring the settings of the TD(s) 110 because the necessary settings were configured on behalf of the user 104 when the user (purchaser) 104 ordered the TD, and/or after the user 104 ordered 106 the TD 110 (e.g., during transit from a manufacturer to the user 104), and/or when the user 104 connects the TD 110 to the intermediate network. FIG. 1 thus illustrates a technical advantage of one or more aspects of this disclosure—the ease with which a user 104 can begin using a TD 110 without having to configure the teleconferencing settings of the TD 110. When one considers that a business user 104 might wish to install fifty or more TDs 110 in multiple buildings in multiple countries, the advantage becomes manifest. A system that enables a user 104 to have the experience illustrated in FIG. 1 is set forth in FIG. 2.

Figure 2:
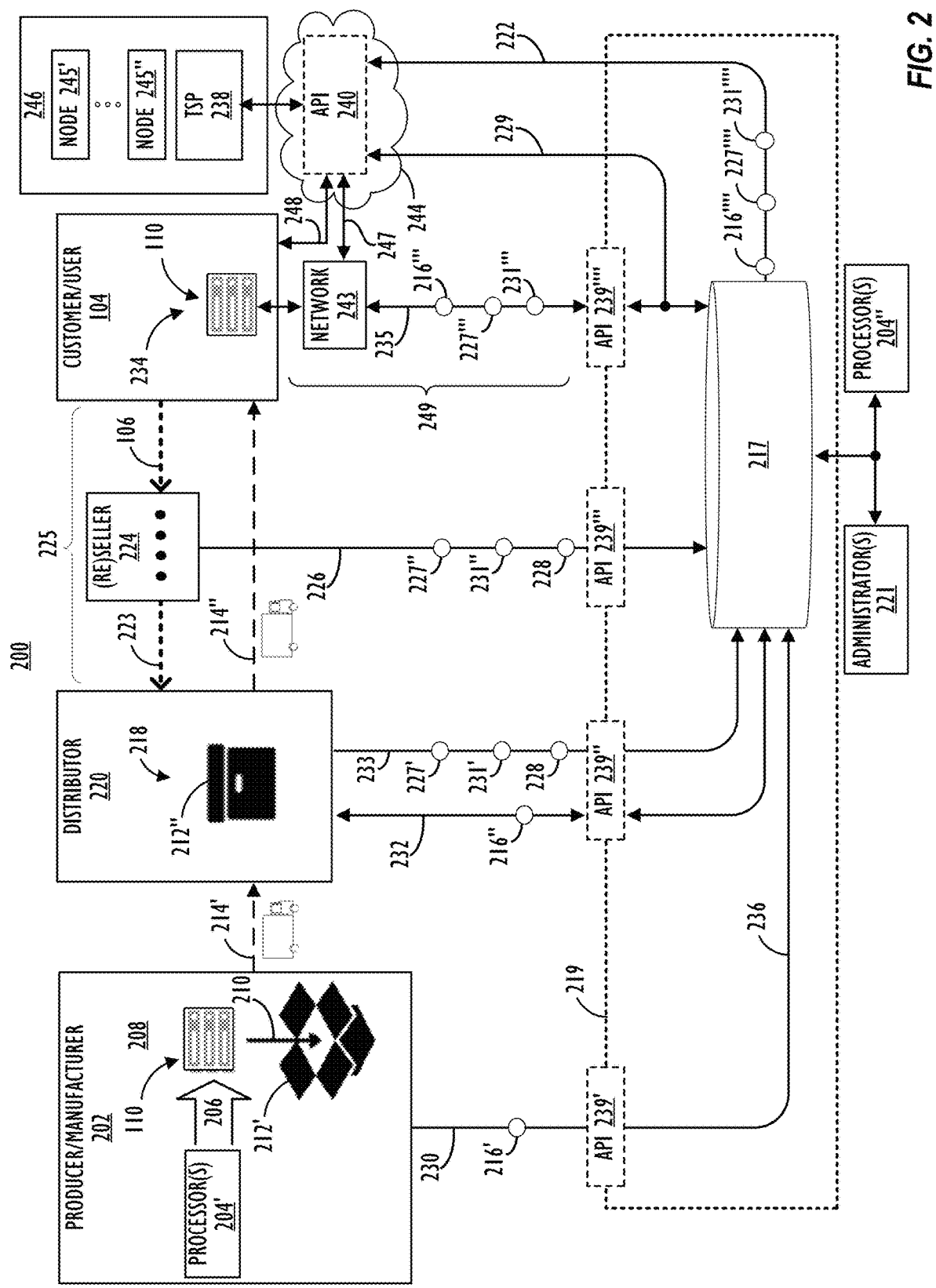
FIG. 2 illustrates a system for provisioning a teleconferencing device, in accordance with an example of this disclosure.

FIG. 2 illustrates a system 200 for provisioning a teleconferencing device (TD) 110, in accordance with an example of this disclosure. A TD 110 is produced 208 by a manufacturer (e.g., at a factory 202). When the TD 110 is manufactured 208, the TD 110 is provided 206 with basic information 216 such as a media access control (MAC) address, a (unique) serial number, and a factory certificate by a processor 204 (e.g., at factory 202). At this stage, however, the TD 110 is not provided with a teleconferencing persona 227 (e.g., Teams) or specific settings associated with such persona 227 and/or associated with the teleconferencing endpoint 114 where the TD 110 will be used. In one or more examples, the system 200 will allocate (provision) to the TD 110 only teleconferencing applications (e.g., 227) that will be used by the customer (user) 104. A technological benefit of this system 200 is that the system 200 reduces the number of stock-keeping units (SKUs) necessary for the TD 110 insofar as each teleconferencing (software) application (e.g., 227) installed on a TD 110 is usually allocated at least one SKU. The system 200 thus obviates the need for surplus teleconferencing applications to be installed on a TD 110. Another benefit of the system 200 is that the procedures by which the system 200 allocates personas are less complex than those conventionally used to allocate personas (e.g., teleconferencing applications) to teleconferencing equipment such as TD 110.

Once the TD 110 is manufactured 208, the TD 110 can be placed 210 in a container 212 and shipped 214 to a distributor 220 who stores 218 the TD 110 temporarily. When the TD 110 is shipped 214 to the distributor 220 for warehousing, (basic) information 216 pertaining to the TD 110, such as the TD's MAC address, serial number, and factory certificate can be transmitted 230 to one or more cloud-based provider(s) 219, (e.g., provisioning server(s)). The cloud-based provider 219 will store 236 the information 216 in one or more databases 217. In at least one example of this disclosure, the factory 202 can use the cloud-based provider's application programming interface (API) 239 to register the new TD 110 and record (store) 236 the identity and location of the distributor 220 to which the TD 110 has been shipped 214. In some examples, the distributor 220 can retrieve 232 information (e.g., 216) regarding the distributor's inventory of TDs 110 by accessing the database(s) 217 through the cloud-based provider's API 239 or through some other web-based interface.

In accordance with the system 200, a customer 104 orders 106 the TD 110 from a seller/reseller 224 of a procurement channel 225. At the time of purchase 106 and/or thereafter, the purchaser 104 can select a teleconferencing service provider (TSP) 238 as well as one or more communication settings 227 associated with the TSP 238. At the time of purchase 106 and/or thereafter, the purchaser 104 can indicate at what teleconferencing endpoint 114 the TD 110 will be used. In some examples, the purchaser 104 can specify one or more additional settings 231 for the TD 110 based on the endpoint 114 indicated. In at least one example, one or more additional settings 231 can be retrieved (such as by an administrator 221) from a database 217 and be assigned to the TD 110 based on the endpoint 114 specified. The one or more additional settings 231 can include sleep settings, language settings, and resolution settings of a display 407 at the designated endpoint 114. In some examples, the one or more additional settings 231 can, at least partially, govern how a teleconferencing application (227) of the TSP 238 running on the TD 110 will interact with components at the endpoint 114. In some examples, the one or more additional settings 231 can, at least partially, govern how the TD 110 itself will interact with components at the endpoint 114 during communications with the TSP 238. In accordance with one or more examples of this disclosure, the one or more additional settings 231 be based on such factors as the size, shape, and ceiling height at the location 114 of the TD's intended use. In some examples, the additional settings 231 can be based on the quantity of meeting participants anticipated to meet at the designated endpoint 114, as well as the quality and/or quantity and/or locations of cameras, microphones, or loudspeakers of the TD 110 and/or the endpoint 114. In at least one example, the settings 231 are based on lighting conditions and/or general audio conditions at the location of the teleconferencing endpoint 114. In some examples, the additional settings 231 can be related to the speed and/or throughput of a network (e.g., 243, 244) through which the TD 110 will communicate 247 with a network 246 of the TSP 238 and/or the speed and/or throughput of a network (e.g., 243, 244) through which the TD 110 will communicate 247 with one or more nodes 245 of the network 246 of the TSP 238. In at least one example, the settings 231 can relate to privacy settings of such networks 243, 244, 246.

After the channel seller 224 receives the customer's order 106 and any related order information (which can include information corresponding to the TD's persona 227 and/or information corresponding to the one or more additional settings 231), the channel seller 224 places an order 223 with the distributor 220 based on the customer's order 106. In some examples, the channel seller 224 determines that the user 104 has an account with a TSP 238 and sends 226 information 228 concerning the customer's order 106 and/or the seller's order 223 to the cloud-based provider 219. The order information 228 can be sent directly to the provider 219 and/or through the distributor 220. In either case, one or more processors 204 of the provider 219 receive the order information 228. The order information 228 can include the customer's TSP account information (e.g., a unique telepresence identification code). Based on order 106 and/or order 223, the processor(s) 204 associates the TD 110 with the TSP 238 in accordance with the customer's TSP account. The cloud-based provider 219 can notify 222 the TSP 238 of the user's 104 purchase 106 through an API 240 of the TSP 238 (e.g., through network 244). In some examples, the cloud-based provider 219 will register the TD 110 with the TSP 238 (e.g., Ring Central™) based on order 106 and/or order 223. When the TD 110 is shipped 214 to the user 104, the distributor 220 can use the cloud-based provider 219 to communicate the customer's TSP account identifier as well as the MAC address and factory serial numbers (216) of the purchased/ordered 106 TD(s) 110. The cloud-based provider 219 can register 222 the TD(s) 110 with the TSP 238 (e.g., Zoho Meetings™) based on the customer's order and TSP account information 228 through the TSP's API 240. Depending on the specific implementation of the process 200, the factory 202, the channel seller 224 or other reseller (not shown) can register 226 the TD 110 and/or update 226 the TD's information 228 at the provisioning server 219 using the cloud-based provider's API 239 or some other web interface. The association/registration/order information 228 and any subsequent changes thereto may be stored in accordance with a persona data model (as will be explained in greater detail below) in a network-accessible repository, such as database(s) 217.

Once the TD 110 arrives 234 at its destination and is unboxed, the customer 104 can communicate 248 with the TSP 238 through their TSP's portal (e.g., API 240) or communicate 235 with the provisioning server 219 through the provisioning server's portal (e.g., API 239), referencing the TD 110 MAC/serial number (216) to determine to which meeting room (e.g., 114) the TD 110 has been assigned (e.g., by purchaser 104 or administrator 221). Thereafter, the TD 110 is connected to a network (e.g., 243), is powered on, and boots up. According to the system 200, the TD 110 contacts 235 the cloud-based provider 219 over a data channel 249. The cloud-based provider 219 recognizes the TD 110 based on the TD's basic information 216. The TD 110 receives the persona 227 (e.g., one or more teleconferencing settings of TSP 238) and additional settings 231 which have been allocated to the TD 110 by the system 200. In some examples of this disclosure, a persona 227 includes the software necessary to configure the TD 110 to communicate using the TSP 238 and/or includes the way the TD 110 communicates through the TSP 238 (e.g., Join.me™) in accordance with the persona 227. Once the persona 227 and additional settings 231 have been installed on the TD 110, the provisioning server 219 notifies 229 the TSP 238 that the installation is complete.

Figure 3:
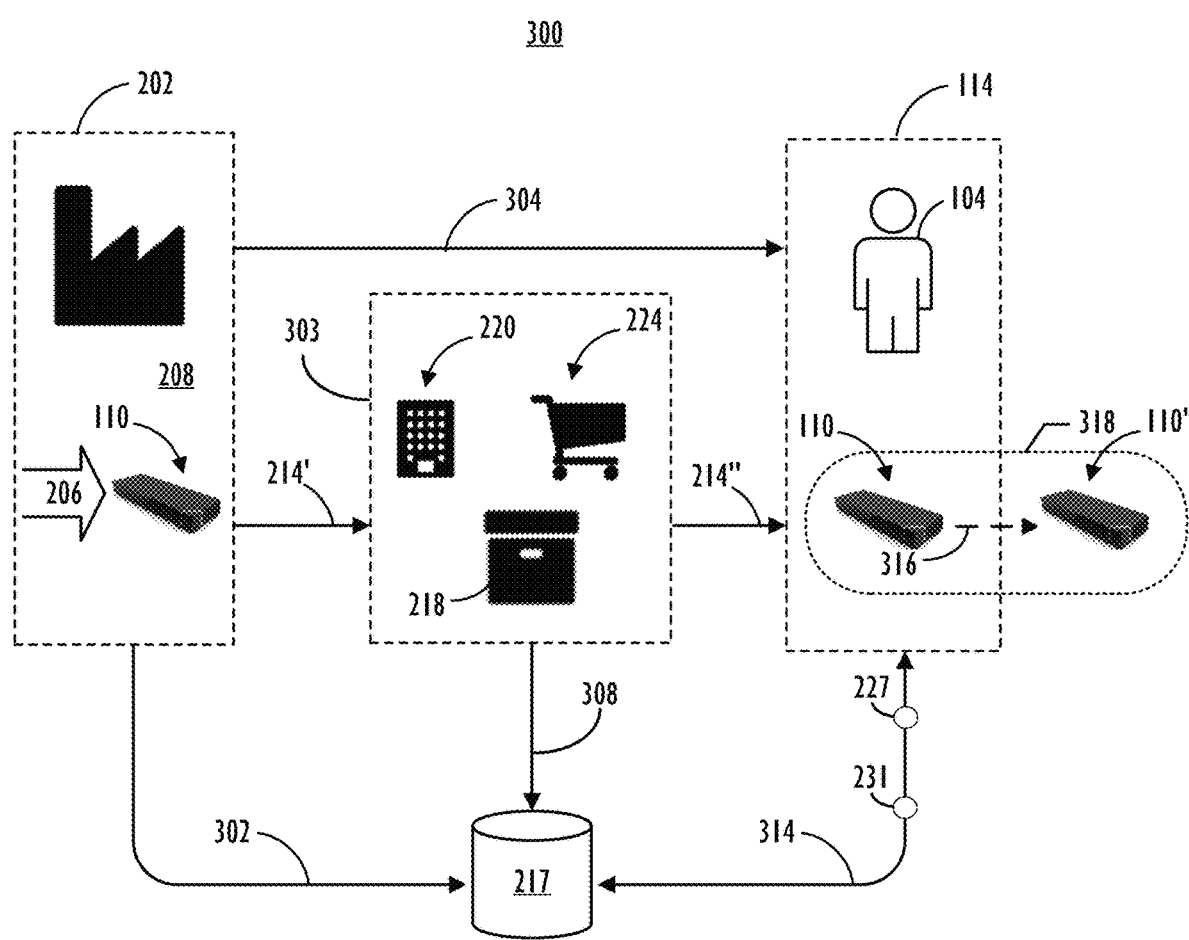
FIG. 3 illustrates another system for provisioning a teleconferencing device, in accordance with an example of this disclosure.

FIG. 3 illustrates system (e.g., 200) 300 for provisioning a teleconferencing device (TD) 110, in accordance with an example of this disclosure. In system 300, the factory 202 provides 208 (e.g., manufactures) the TD 110 and installs 206 certificate information etc. (216), as described in FIG. 2. The manufacturer 202 can ship 304 the TD 110 directly to the customer 104. Alternately, the manufacturer 202 ships 214 the TD 110 to a distributor 220 or channel seller 224 (303) which stores 218 the TD 110 before the TD 110 is thereafter shipped 214 to the customer 104. Before shipping 304, 214 the TD 110, or as part of the shipping process 304, 214, the manufacturer 202 can register 302 the TD 110 with a TSP (e.g., 238) and store the registration information in a database(s) 217. When the distributor 220 or channel seller 224 has custody of the TD 110, the distributor 220 or channel seller 224 can transmit 308 information (e.g., the current location of the TD 110) or other information concerning one or more TSPs 238 associated with the user 104 to the database(s) 217. When the customer 104 receives the TD 110 and boots up the TD 110 at an endpoint 114, the TD 110 will contact 314 the database(s) 217 and be provisioned with a desired persona 227 and other settings 231 specific to the endpoint 114, as stored in the database(s) 217. In at least one example of this disclosure, once the TD 110 has been provisioned with the desired persona 227 and any additional settings 231, the TD 110 will attempt to contact 316 another TD 110. In at least one example of this disclosure, once the TD 110 has been provisioned with the desired persona 227, the TD 110 will attempt to contact 316 another TD 110 to establish a network 318, such as a network provided/enabled by the TSP 238.

In some examples of the system 300, while the user 104 waits for their TD(s) 110 to arrive, the user 104 is able to log into a management application of the TSP 238 (e.g., Intermedia AnyMeeting™), and view records pertaining to their TD 110. Such records can include configuration information (e.g., 216, 227) for each purchased 106 TD 110. In some examples, the user 104 can designate the location 114 at which a TD 110 will be used while purchasing 106 the TD 110 and/or thereafter. In some examples, the user 104 can make adjustments to the TD's settings (e.g., 231) before the TD 110 is delivered, thereby providing the benefit that once the TD 110 is received, the party receiving the TD 110 will know where (e.g., at which endpoint 114) to install the TD 110 and will be able to use the TD 110 immediately once the TD 110 is connected to a network (e.g., 246) (such as through the internet 244) without further intervention by the user 104. The end user 104 therefore requires no additional technical assistance to begin using the TD 110 in the manner desired.

Figure 4:
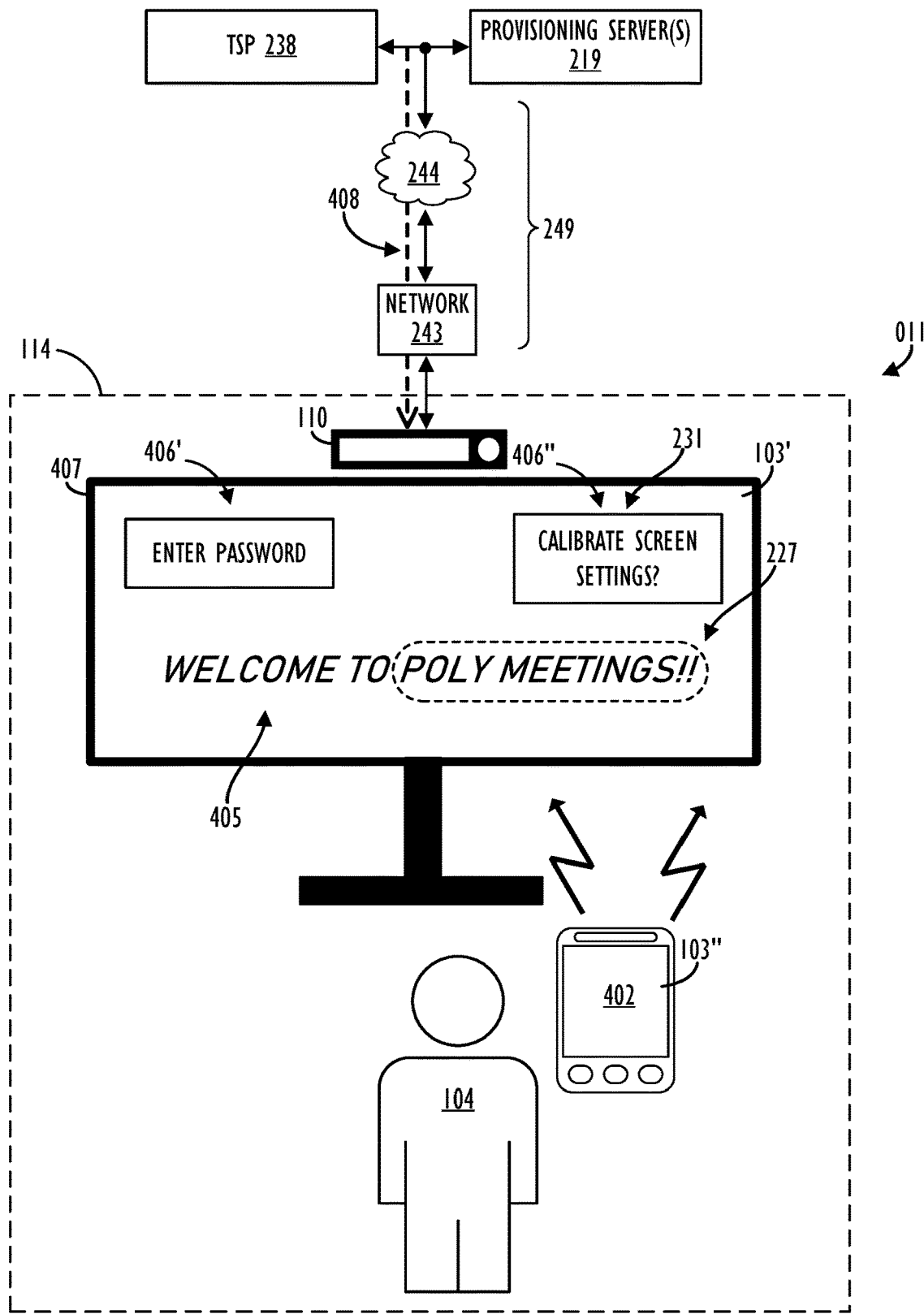
FIG. 4 illustrates an operational environment of a teleconferencing device, in accordance with an example of this disclosure.

FIG. 4 illustrates an operational environment 400 of a teleconferencing device (TD) 110, in accordance with an example of this disclosure. In FIG. 4, a user 104 has placed a TD 110 at an endpoint 114 where the TD 110 will interact with another piece of teleconferencing equipment (e.g., display 407). The user 104 connects the TD 110 to a network 243 which causes the TD 110 to attempt to contact the provisioning server(s) 219 and/or the user's TSP 238 to retrieve the persona 227 as well as additional settings 231 through a network 244 of channel 249. In rare instances, not all aspects of the persona 227 and/or the additional settings 231 (e.g., resolution of display 407) might be retrievable by the TD 110. The TD 110 is, however, configured to prompt 406 the user 104 to manually configure the TD 110 to operate at the endpoint 114 in accordance with the desired settings (e.g., 227, 231).

In some examples of this disclosure, once the TD 110 is installed in its room (e.g., 114) and adopts 405 its designated persona 227, a secondary (input) device 402 (such as a touch controller) is automatically configured by the TD 110 to operate in accordance with the allocated persona 227 and any additional settings 231. In accordance with one or more examples of this disclosure, the TD 110 may be registered with more than one TSP 238 and be able to adopt 405 more than one persona 227 depending on the desires of the user 104. In such case, a user interface 103 enables a user 104 to cause the TD 110 to adopt 405 a persona 227 on-demand. For example, a codec (not shown) of the TD 110 may adopt 405 a Go To Meeting™ persona 227 when the user 104 selects a Go To Meeting teleconference application (e.g., 227) using the touch controller 402.

Figure 5:
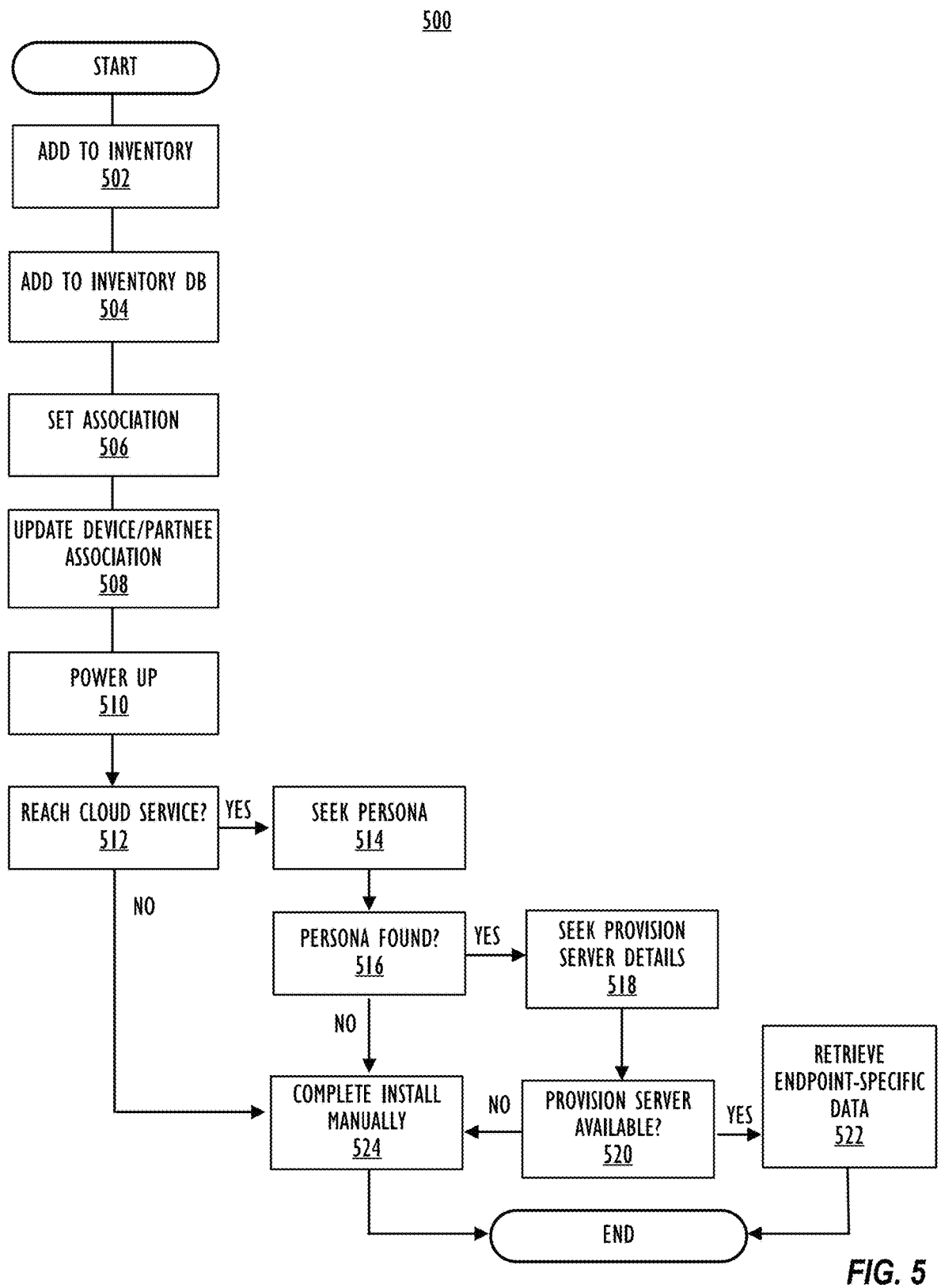
FIG. 5 illustrates a first method of provisioning a teleconferencing device, in accordance with an example of this disclosure.

FIG. 5 illustrates a method 500 of provisioning a teleconferencing device (TD) 110, in accordance with an example of this disclosure. At step 502 of the method 500, the TD 110 is added to a seller's inventory or a distributor's inventory, and thereafter information (e.g., 216) concerning the TD 110 is added 504 to the seller's inventory database. The TD 110 is then associated 506 with a TSP 238 and information concerning the association (e.g., 227) is updated 508 in the TSP's database. Once the TD 110 is received by the user 104, the TD 110 can be powered on 510. Once the TD 110 is powered on 510, the TD 110 will attempt to contact 248 the TSP 238 and the TD 110 will determine 512 whether the attempt was successful. If the TD 110 can contact the TSP 238, the TD 110 will attempt to retrieve 514 (e.g., 408) the TD's persona information (e.g., 227) from the database (e.g., 217) of the TSP 238. A determination 516 is then made as to whether the persona 227 was found. If the persona 227 was found, the TD 110 will attempt 518 to retrieve (e.g., 408) information about the provisioning server (e.g., 219), such as the provisioning server's internet protocol address. If the TD 110 is able to retrieve (e.g., 408) the provisioning server information, the TD 110 will, at step 522, log into the provisioning server 219 and retrieve (e.g., 408) and install additional provisioning information 231 in accordance with the persona 227 and based on aspects of the endpoint 114 designated for the TD 110, and the method 500 will end. On the other hand, if the TD 110 is unable to retrieve (e.g., 408) the provisioning information 231 (e.g., from a provisioning server 219), the user 104 can perform a manual installation 524. For example, the user can contact the TSP 238 and/or provisioning server 219 through a web-based user interface 103 to retrieve provisioning information (e.g., 227, 231) from the TSP 238 and/or provisioning server 219. Once the TD 110 is provisioned with the prearranged persona 227 and one or more additional settings 231 corresponding to a physical location (e.g., a designated teleconferencing endpoint 114) of the TD 110, the method 500 ends. Likewise, if the TD 110 determines 512 that the TD 110 is unable to contact the cloud server (e.g., 219) when the TD 110 is initially powered up 510, or if the TD 110 determines 516 that the TD 110 is unable to locate the association/persona information (see 506, 508), the user 104 can contact the TSP 238 and/or provisioning server 219 through a web-based user interface 103 and request provisioning information from the TSP 238 and/or provisioning server 219, and complete the installation manually 524. Again, once the TD 110 is provisioned with the prearranged persona 227 and the one or more additional settings 231, the method 500 ends.

As noted, a TD 110 of this disclosure may be provisioned with a persona 227 in accordance with a persona data model. An example of a persona data model is shown below in Table 1. The persona data model may be created or updated by the manufacturer 202, distributor 220, and/or reseller 224. The persona data model may be formatted according to XML, JSON, or another user-readable format. Information of the persona data model can include, but is not limited to, a domain name, a server address, a server type, and authentication information, the name(s) of one or more TSPs, addresses of software corresponding to one or more TSPs, and one or more device settings associated with one or more TSPs.

TABLE 1

Persona Data Model

```
// persona
{
  "apps": [
  {
    "name": "zoom",
    "package": "us.zoom.azr"
  },
  {
    "name": "teams",
    "package": "com.microsoft.teams"
  },
  ],
  "defaultLauncher": "zoom.us"
}
// profile
{
  "properties": {
    "prov.server.type": "rprm",
    "prov.server.address": "1.2.3.4",
    "prov.server.domain": "local",
    "prov.server.localAuth": false,
    "prov.server.username": "administrator",
    "prov.server.password": "personas"
  }
}
```

Figure 6:
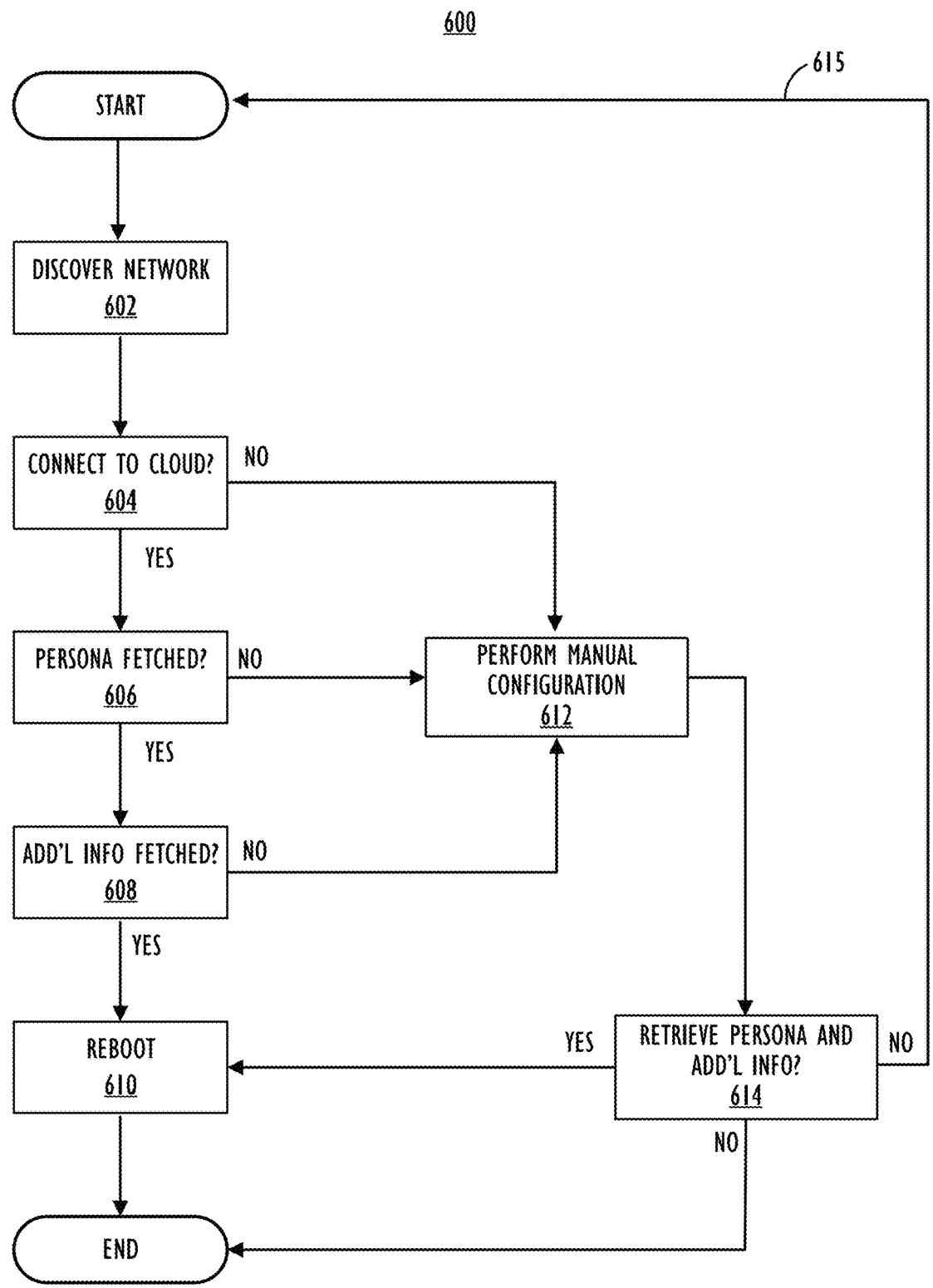
FIG. 6 illustrates a second method of provisioning a teleconferencing device, in accordance with an example of this disclosure.

FIG. 6 illustrates a method 600 of provisioning a teleconferencing device (TD) 110, in accordance with an example of this disclosure. The method 600 can begin after the TD 110 has been initially powered on 510 and connected to a network (e.g. 234) by a user 104. At step 602, the TD 110 discovers (detects) that the TD 110 is connected to the network and thereafter attempts to connect to the cloud (e.g., 244). If the TD 110 determines 604 that it is unable to connect to the cloud, the end user 104 will need to manually configure 612 at least some aspects of the TD 110. On the other hand, if the TD 110 determines 604 that it can connect to the cloud, the TD 110 will attempt to fetch the TD's predesignated persona 227 (e.g., information of the persona data model of Table 1). If the TD 110 determines 606 that it is unable to fetch the TD's predesignated persona 227, the end user 104 will need to manually configure 612 at least some settings of the TD 110. On the other hand, if the TD 110 determines 606 that it can fetch the TD's predesignated persona 227, the TD 110 will attempt to fetch additional provisioning information (e.g., 231) through the cloud (e.g., from provisioning server 219). If the TD 110 determines 608 that it is unable to fetch the additional provisioning information through the cloud, the end user 104 will need to manually configure 612 at least some settings of the TD 110, (e.g., one or more additional settings corresponding to a physical location/specific teleconferencing endpoint 114), such as a room name associated with the physical location, sleep settings, language settings, and resolution settings of a display 407 at the teleconferencing endpoint 114. However, if the TD 110 determines 608 that it can retrieve (e.g., 408) the additional provisioning information 231 through the cloud, the TD 110 will install the persona 227 and provisioning information 231, and the TD 110 will be able to interact with the TSP 238 in accordance with the TD's individual persona 227 and additional settings 231. Likewise, in those rare instances where the end user 104 needs to manually configure 612 at least some aspects of the TD 110, the TD 110 will thereafter determine 614 whether the TD 110 has been able to detect and load the TD's persona 227 and/or additional settings 231. If the TD 110 determines 614 that the TD 110 has been able to detect and load the TD's persona 227 and/or additional settings 231, the TD 110 will (re)boot 610 to install the persona 227 and/or additional provisioning information 231, and the TD 110 will thereafter be able to interact with the TSP 238 in accordance with the TD's individual persona 227 and other settings 231. If in the unlikely event that the TD 110 determines 614 that it was not able to detect and load the TD's persona 227 and/or additional settings 231 despite the manual configuration 612, the end user 104 can reinitialize 615 the TD 110 or the method 600 can end.

Figure 7:
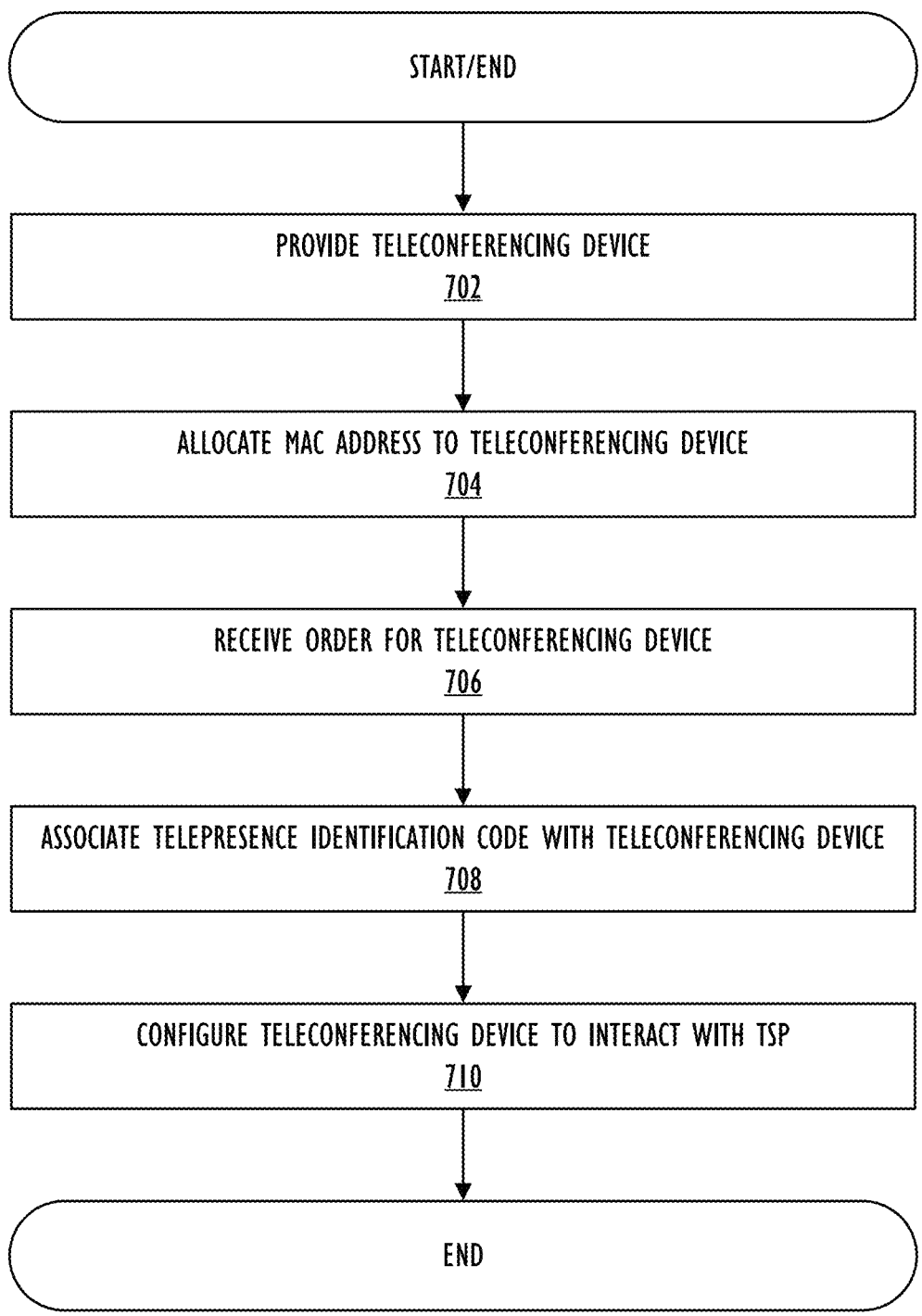
FIG. 7 illustrates a third method of provisioning a teleconferencing device, in accordance with an example of this disclosure.

FIG. 7 illustrates a method 700 of provisioning a teleconferencing device (TD) 110, in accordance with an example of this disclosure. The method 700 includes providing 702 (e.g., manufacturing 208, shipping 214) a TD 110 and allocating 704 (e.g. 206) a media access control address and a serial number to the TD 110. The method 700 further includes receiving 706, at a first processor 204, an order (e.g., 106, 223) for the first TD 110, and associating 708, based on the order, a unique telepresence identification code with the first TD 110, the unique telepresence identification code corresponding to a TSP 238 and one or more communication settings (e.g., 227). Thereafter, the method 700 includes configuring 710 the first TD 110 to interact with the TSP 238. In at least one example of the method 700, configuring 710 the first TD 110 to interact with the TSP 238 comprises configuring the first TD 110 to: attempt to establish a channel (e.g., 249) with the TSP 238 when the TD 110 is coupled to a network (e.g., 243); and communicate, when the channel 249 is established, with one or more second TDs 110 through a node (e.g., 245) of the TSP 238 in accordance with the one or more communication settings.

Figure 8:
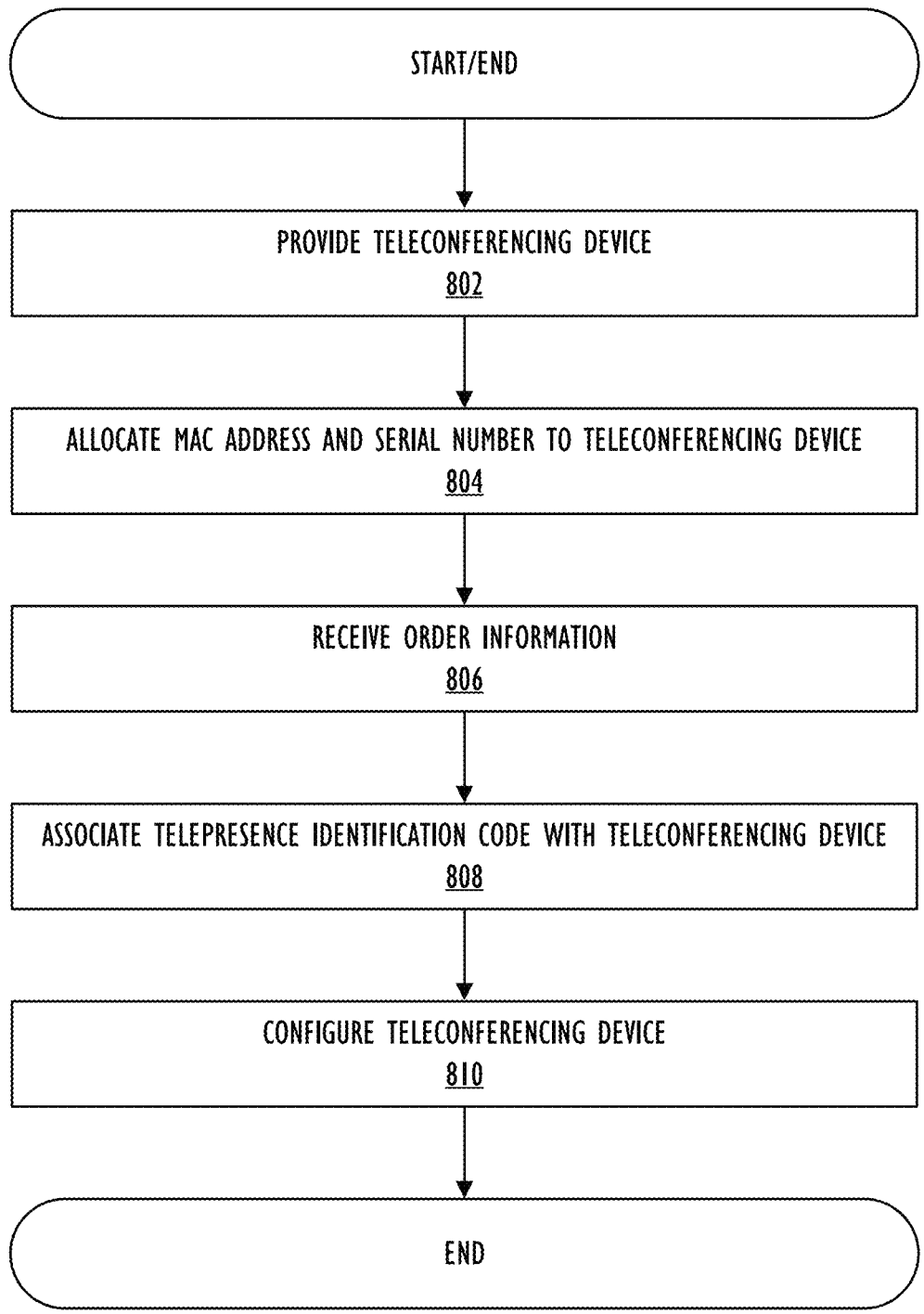
FIG. 8 illustrates a fourth method of provisioning a teleconferencing device, in accordance with an example of this disclosure.

FIG. 8 illustrates another method 800 of provisioning a teleconferencing device (TD) 110, in accordance with an example of this disclosure. The method begins at step 802 in which a TD 110 is provided (e.g., manufactured 208). Thereafter, in step 804, a media access control address and a serial number are allocated (e.g., 206) to the TD 110. Once the TD 110 has been allocated 206 the media access control address and serial number, the method 800 proceeds to step 806 which includes receiving, at one or more processors 204, order information (e.g., 228) corresponding to the TD 110. Thereafter, in step 808 the one or more processors 204 associate a unique telepresence identification code (e.g., a user's password and account information) with the TD 110 based on the order information 228 of step 806. The unique telepresence identification code corresponds to a TSP 238 and one or more communications settings (e.g., 227) of the TSP 238. The method 800 then proceeds to step 810, in which the one or more processors 204 configure the TD 110 to perform various operations when the TD 110 is initially powered on 510 and coupled to a network (e.g., 243). These operations include: attempting to retrieve (e.g., 408), through the network 243, the one or more communications settings 227 of the TSP 238 from one or more provisioning servers 219 based on the unique telepresence identification code and the serial number of the TD 110; installing the one or more communications settings 227 of the TSP 238 when retrieved 408 from the one or more provisioning servers 219; and attempting to communicate 248 with the TSP 238. In at least one example, in step 810, the TD 110 is configured to attempt to communicate 248 with the TSP 238 through the network 243, 244 in accordance with the one or more communications settings 227 of the TSP 238, based on the media access control address allocated 206 to the TD 110 in step 804.

In some examples of this disclosure, method 700 and/or method 800 also include configuring the TD 110 to: determine that the attempt to retrieve 408 the one or more communications settings 227 of the TSP 238 from the one or more provisioning servers 219 based on the unique telepresence identification code and the serial number of the TD 110 has failed; render a prompt 406 using a display 407 of the TD 110 for a user 104 to provide the one or more communications settings 227 of the TSP 238; and install the one or more communications settings 227 of the TSP 238 when provided by the user 104.

In some examples of this disclosure, method 700 and/or method 800 also include configuring the TD 110 to: attempt to retrieve 408, based on the one or more communications settings 227 of the TSP 238, one or more additional settings 231 from the one or more provisioning servers 219 through the network 243, 244, the one or more additional settings 231 corresponding to a designated teleconferencing endpoint 114 of the TD 110; and install the one or more additional settings 231, wherein attempting to communicate 248 with the TSP 238 further comprises attempting to communicate 248 with the TSP 238 through the network 243, 244 in accordance with the one or more additional settings 231 corresponding to the specified teleconferencing endpoint 114 of the TD 110.

In accordance with one or more examples of this disclosure, the one or more communications settings 227 of the TSP 238 comprise one or more of a domain name, a server address, a server type, and authentication information corresponding to the one or more additional settings 231. In at least one example, the one or more additional settings 231 correspond to the specific teleconferencing endpoint 114 of the TD 110. In some examples, the settings 231 comprise one or more of a room name associated with the teleconferencing endpoint 114, sleep settings, language settings, and resolution settings of a display 407 corresponding to the teleconferencing endpoint 114. In some examples, the display 407 is a component of the TD 110.

In some examples of this disclosure, method 700 and/or method 800 also include configuring the TD 110 to: determine that the attempt to retrieve 408 the one or more additional settings 231 corresponding to the specified teleconferencing endpoint 114 of the TD 110 has failed; render a prompt 406 using a display 407 of the TD 110 for a user 104 to provide the one or more additional settings 231 corresponding to the specified teleconferencing endpoint 114 of the TD 110; and install the additional settings 231 corresponding to the physical location (designated teleconferencing endpoint 114) of the TD 110 when provided by the user 104. In at least one example, method 700 and/or method 800 also include configuring the TD 110 to: wirelessly couple to a secondary input device 402; receive, from the secondary input device 402, a selection of at least one communications setting (e.g., selecting the ability to record meetings) from among the one or more communications settings 227; and initiate a teleconference with at least one other TD 110 in accordance with the selection of the at least one communications setting.

In one or more examples, method 700 and/or method 800 also include configuring the TD 110 to attempt to communicate 248 with the TSP 238 by attempting to establish a local teleconferencing network 318 with one or more other TDs 110, wherein each of the one or more other TDs 110 is associated with a different unique telepresence identification code of the TSP 238.

In accordance with at least one example, method 700 and/or method 800 also include receiving, at the one or more processors 204, a request to revise the order information 228 corresponding to the TD 110; disassociating, using the one or more processors 204, the unique telepresence identification code from the TD 110, responsive to the request to revise the order information 228; and associating, using the one or more processors 204, an alternate unique telepresence identification code with the TD 110, the alternate unique telepresence identification code corresponding to a different TSP 238 and one or more different communications settings.

Figure 9:
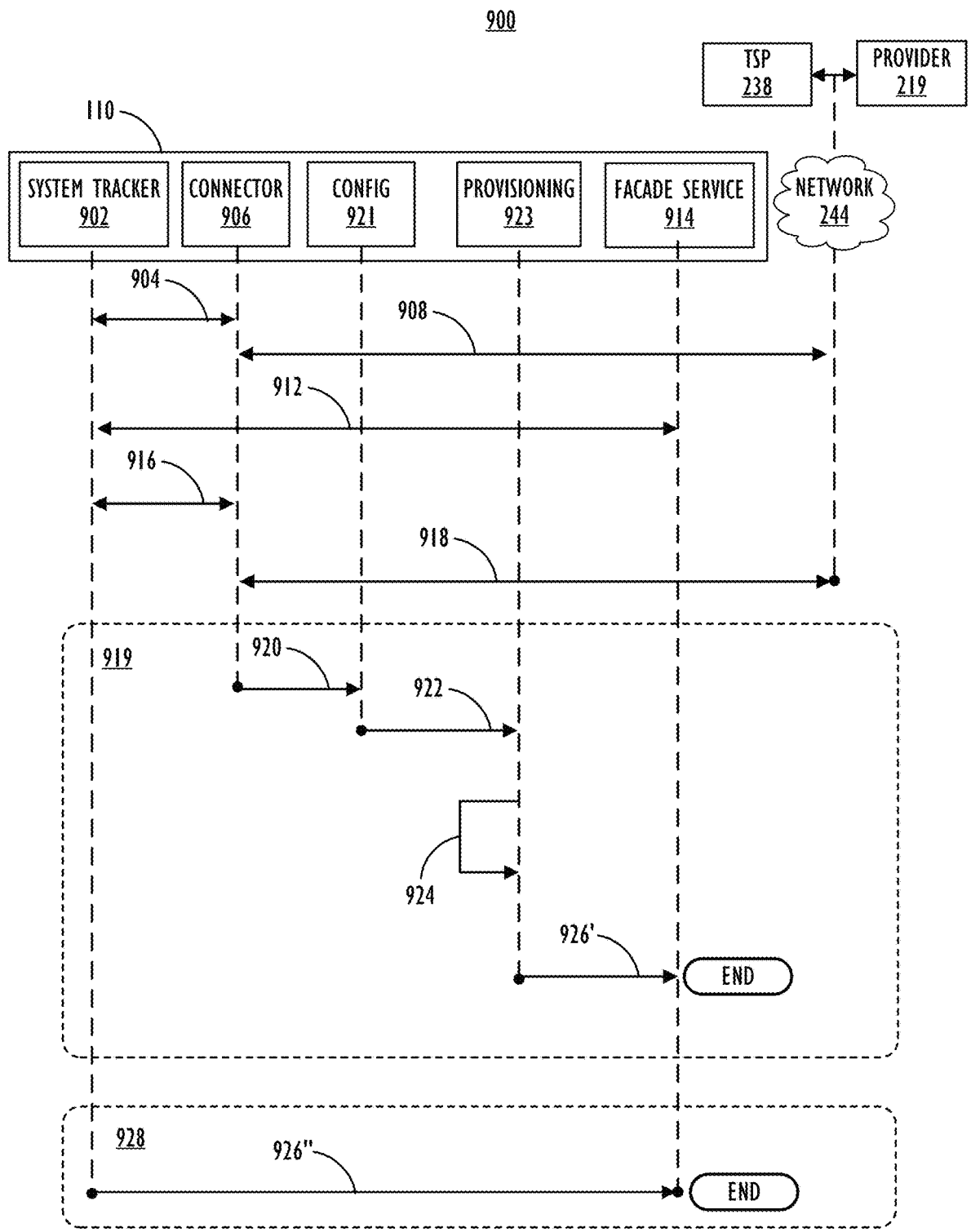
FIG. 9 is a communication flow diagram illustrating initialization of a teleconferencing device, in accordance with an example of this disclosure

FIG. 9 is a communication flow diagram illustrating initialization 900 of a teleconferencing device (TD) 110, in accordance with an example of this disclosure. During Initialization 900, an application running on the TD 110 (e.g., system tracker 902) interacts with a connector application 906 of the TD 110. The first application 902 requests 904 the connector application 906 to retrieve persona 227 information for the TD 110. The connector application 906 contacts 908 (e.g., 248) the TSP 238 and/or contacts (e.g., 235) the provisioning provider 219 and receives 908 the desired persona 227 information. The system tracker application 902 then interacts 912 with a facade service application 914, which directs the system tracker application's configuration of the TD's persona 227 in accordance with the persona 227 information. Thereafter, the system tracker application 902 requests 916 the connector application 906 to retrieve 918 (e.g., 408) secondary provisioning information 231 from the TSP 238 and/or from the provisioning provider 219. If the secondary provisioning information 231 is available, the system tracker application 902 will (as shown in block 919) configure 920 the TD 110 in accordance with the secondary provisioning information 231, and a configuration application 921 of the TD 110 will contact 922 provisioning application 923. The provisioning application 923 then provisions (e.g., installs) 924 the TD 110 with the desired persona 227 and secondary provisioning information 231. If provisioning 924 by the provisioning application 923 caused the persona 227 of the TD 110 to be changed, the provisioning application 923 will cause the TD 110 to reboot 926 and update the facade service application 914 to complete installation of the (new) persona 227. On the other hand, if the additional provisioning information 231 was not able to be retrieved (918), the system tracker application 902 will determine whether (in block 928) the device's persona 227 was changed by some other means (perhaps involving some amount of user action). If the device's persona 227 was changed, the system tracker application 902 will cause the TD 110 to reboot 926 and update the facade service application 914 to complete installation of the (new) persona 227.

Figure 10:
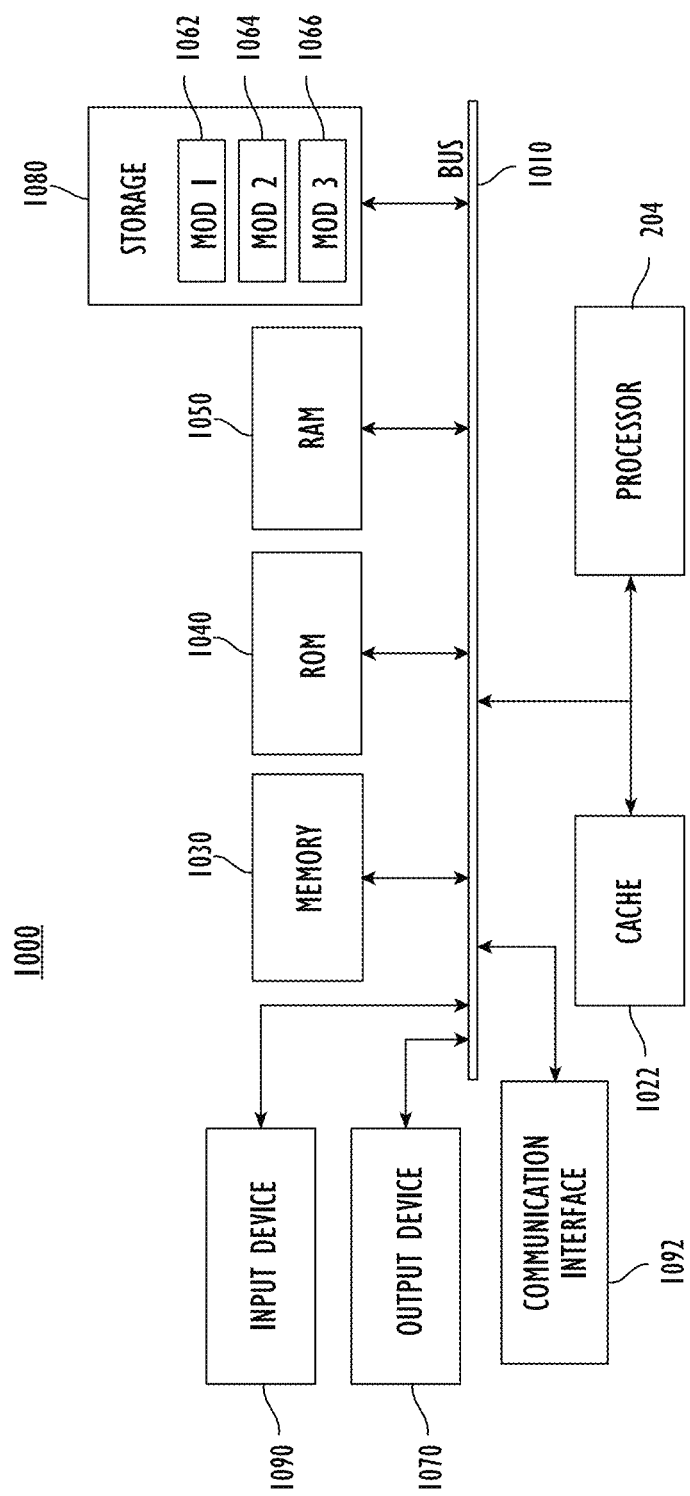
FIG. 10 illustrates a computing system for provisioning a teleconferencing device, in accordance with an example of this disclosure.

FIG. 10 illustrates a computing system 1000 for provisioning a teleconferencing device (TD) 110, in accordance with an example of this disclosure. The components of the system 1000 can be incorporated in whole or in part into computing devices and systems operable to configure a TD 110. As shown, system 1000 can include a processing unit (CPU or processor) 204 and a system bus 1010. System bus 1010 interconnects various system components—including the system memory 1030 such as read only memory (ROM) 1040 and random-access memory (RAM) 1050—to the processor 204. The bus 1010 connects processor 204 and other components to a communication interface 1092 through which the system 1000 can interact with the other systems (e.g., TSP 238). The processor 204 can comprise one or more digital signal processors. The system 1000 can include a cache 1022 of high-speed memory connected directly with, near, or integrated as part of the processor 204. The system 1000 copies data from the memory 1030 and/or the storage device 1080 to the cache 1022 for quick access by the processor 204. In this way, the cache 1022 provides a performance boost that avoids processor 204 delays while waiting for data. These and other modules can control or be configured to control the processor 204 to perform various actions, such as configuring/provisioning a TD 110 with a persona 227 and additional settings 231. Other system memory 1030 may be available for use as well. The memory 1030 can include multiple different types of memory with different performance characteristics. The processor 204 can include any general-purpose processor and a hardware module or software module, such as module 1 (1062), module 2 (1064), and module 3 (1066) stored in storage device 1080, operable to control the processor 204 as well as a special-purpose processor where software instructions are incorporated into the actual processor design. The processor 204 may essentially be a completely self-contained computing system, containing multiple cores or processors 204, a bus 1010, memory controller (not shown), cache 1022, etc.

The system bus 1010 may be any of several types of bus structures including a memory bus or memory controller, a peripheral bus, and a local bus using any of a variety of bus architectures. A basic input/output system (BIOS) stored in ROM 1040 or other memory, may provide the basic routine that helps to transfer information between elements within the system 1000. The system 1000 can include storage devices 1080 such as a hard disk drive, a magnetic disk drive, an optical disk drive, tape drive or the like. The storage device 1080 can include software modules 1062, 1064, 1066 for controlling the processor 204. The storage device 1080 can be connected to the system bus 1010 by a drive interface (not shown). The drives and the associated computer readable storage media provide nonvolatile storage of computer readable instructions, data structures, program modules and other data for the system 1000. In at least one example, a hardware module that performs a function includes the software component stored in a non-transitory computer-readable medium coupled to the hardware components—such as the processor 204, bus 1010, output device 1070, input device 1090 and so forth—necessary to carry out the function.

For clarity of explanation, the computing system 1000 of FIG. 10 is presented as including individual functional blocks including functional blocks labeled as a "processor." The functions these blocks represent may be provided using either shared or dedicated hardware, including, but not limited to, hardware capable of executing software and hardware, such as a processor 204, that is purpose-built to operate as an equivalent to software executing on a general-purpose processor. For example, the functions of one or more processors 204 presented in FIG. 10 may be provided by a single shared processor or multiple processors 204.

Figure 11:
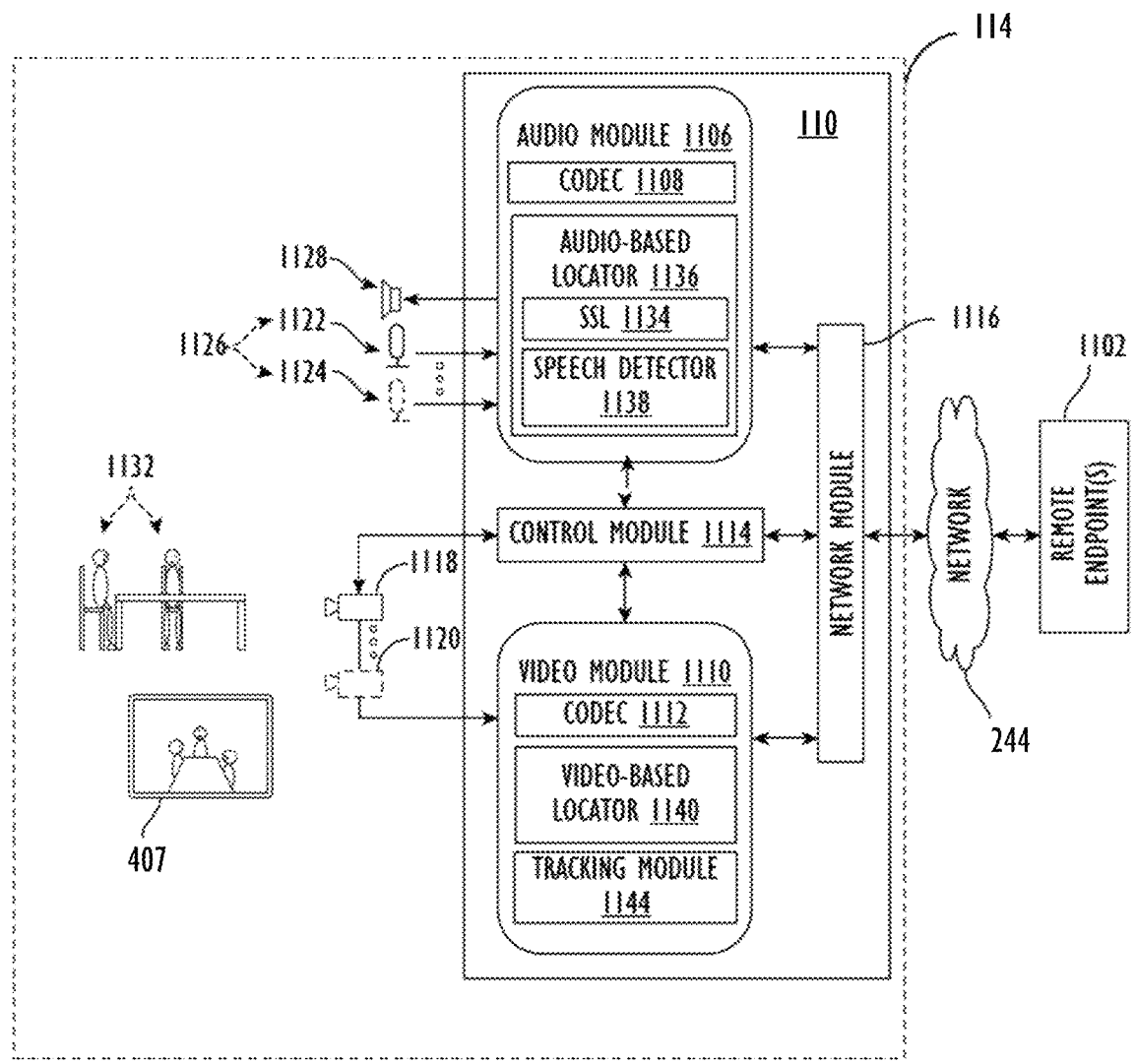
FIG. 11 illustrates a teleconferencing device provisioned in accordance with one or more systems and methods of this disclosure.

FIG. 11 illustrates a teleconferencing device (TD) 110 provisioned in accordance with one or more systems and/or one or more methods (e.g., 500, 600, 700, 800) of this disclosure. The teleconferencing (e.g., videoconferencing) device 110 includes multiple components to provide a pleasant teleconferencing experience. In various examples of this disclosure, the operations, functions, and settings of one or more of the components can be designated as part of the TD's persona 227 or other additional settings 231. The TD 110 enables people at the teleconferencing endpoint 114 to communicate with people at one or more remote teleconferencing endpoints 1102 (114) over a network 244. Components of the TD 110 can include an audio module 1106 with an audio codec 1108, and a video module 1110 with a video codec 1112. Video module 1110 can include a video-based locator 1140, which can be used to locate videoconference participants 1132 during videoconferences. Video module 1110 can also include a tracking module 1144, which can be used to track the locations of videoconference participants 1132 at the teleconferencing endpoint 114. Audio module 1106 and video module 1110 can be operatively coupled to a control module 1134 and a network module 1116. The TD 110 can include and/or can be coupled to least one camera 1118 at the (teleconferencing) endpoint 114. The camera(s) 1118 can be used to capture a video at the endpoint 114. In some examples of this disclosure, the endpoint 114 includes one or more additional cameras 1120. The camera(s) 1118 can be used to detect (video) data indicating a presence of one or more persons (e.g., participants 1132) at the endpoint 114. In some examples, when a participant 1132 is focused upon by a camera (e.g., 1118), a sub-portion of the captured image frame containing the participant 1132 is rendered—e.g., displayed on a display 407 and/or transmitted to a remote endpoint 1102 (114)—whereas other portions of the image frame are not.

During a videoconference, if present, camera 1118 can capture video and provide the captured video to the video module 1110. Additionally, one or more microphones (e.g., 1122, 1124) can capture audio and provide the captured audio to the audio module 1106 for processing. The captured audio and concurrently captured video can form a data stream. Microphone 1122 can be used to detect (video) data indicating a presence of one or more persons (e.g., participants 1132) at the endpoint 114. Depending on how the TD 110 is configured (e.g., based on the TD's persona 227), the TD 110 can use the audio captured with microphone 1122 as conference audio.

In some examples, the microphones 1122, 1124 can reside within a microphone array (e.g., 1126) that includes both vertically and horizontally arranged microphones for determining locations of audio sources, e.g., participants 1132 who are speaking.

After capturing audio and video, the TD 110 encodes the captured audio and video in accordance with an encoding standard, such as MPEG-1, MPEG-2, MPEG-4, H.261, H.263, and H.264 and their descendants. Then, the network module 1116 outputs the encoded audio and video to the remote endpoints 1102 (114) via the network 244 using an appropriate protocol. Similarly, the network module 1116 receives conference audio and video through the network 244 from the remote endpoints 1102 (114) and transmits the received audio and video to their respective codecs 1108/1112 for processing. Endpoint 114 can also include a loudspeaker 1128 which outputs conference audio, and a display 407 which outputs conference video.

Using camera 1118, the TD 110 can capture a view of a room at the endpoint 114, which could include all (videoconference) participants 1132 at the endpoint 114, as well as some of their surroundings. According to some examples, the TD 110 uses camera 1118 to capture video of one or more participants 1132, including one or more current talkers, in a tight view. In at least one example, camera 1118 is associated with a sound source locator (e.g., 1134) of an audio-based locator (e.g., 1136).

In one or more examples, the TD 110 may use the audio-based locator 1136 and a video-based locator 1140 to determine locations of participants 1132 and frame views of the environment and participants 1132. The control module 1134 may use audio and/or video information from these locators 1136, 1140 to crop one or more captured views, such that one or more subsections of a captured view will be displayed on a display 407 and/or transmitted to a remote endpoint 1102 (114).

In some examples, to determine how to configure a view, the control module 1134 uses audio information obtained from the audio-based locator 1136 and/or video information obtained from the video-based locator 1140. For example, the control module 1134 may use audio information processed by the audio-based locator 1136 from one or more microphones (e.g., 1122, 1124). In some examples, the audio-based locator 1136 includes a speech detector 1138 which can be used to detect speech in audio captured by microphones 1122, 1124 to determine a location of a current participant 1132. In some examples, the control module 1134 uses video information captured using camera 1118 and processed by the video-based locator 1140 to determine the locations of participants 1132 and to determine the framing for captured views. It will be evident to those of skill in the art that one or more of the functionalities and settings of one or more components of the TD 110 can be established in accordance with one or more aspects of the TD's persona 227 and/or additional provisioned settings 231 in accordance with the various methods and systems (e.g., 200, 300) described in this disclosure.

Examples of this disclosure also include the following examples:

1. A teleconferencing device (TD) 110 having a media access control address, wherein the TD 110 is configured to: attempt to retrieve 408, through a network (e.g., 243, 244), one or more communications settings 227 of a TSP 238 from one or more provisioning servers 219 based on a unique telepresence identification code and a serial number assigned to the TD 110, when the TD 110 is coupled to the network (e.g., 243, 244); install the one or more communications settings 227 of the TSP 238 when retrieved 408 from the one or more provisioning servers 219; and attempt to communicate 248 with the TSP 238, wherein attempting to communicate 248 with the TSP 238 comprises attempting to communicate 248 with the TSP 238 through the network (e.g., 243, 244) in accordance with the one or more communications settings 227 of the TSP 238, based on the media access control address.

2. The TD 110 of example 1, wherein the TD 110 is further configured to: determine that the attempt to retrieve 408 the one or more communications settings 227 of the TSP 238 from the one or more provisioning servers 219 based on the unique telepresence identification code and the serial number of the TD 110 has failed; render a prompt 406 using a display 407 of the TD 110 for a user 104 to provide the one or more communications settings 227 of the TSP 238; and install the one or more communications settings 227 of the TSP 238 when provided by the user 104.

3. The TD 110 of example 1, wherein the TD 110 is further configured to: attempt to retrieve 408, based on the one or more communications settings 227 of the TSP 238, one or more additional settings 231 from the one or more provisioning servers 219 through the network (e.g., 243, 244), the one or more additional settings 231 corresponding to a designated teleconferencing endpoint 114 of the TD 110; and install the one or more additional settings 231, wherein attempting to communicate 248 with the TSP 238 further comprises attempting to communicate 248 with the TSP 238 through the network (e.g., 243, 244) in accordance with the one or more additional settings 231 corresponding to the teleconferencing endpoint 114 of the TD 110.

4. A teleconferencing provisioning system comprising one or more processors 204 and at least one memory (e.g., 1030) storing instructions executable by the one or more processors 204, wherein the instructions comprise instructions to: allocate a media access control address and a serial number to a teleconferencing device (TD) 110; receive order information 228 corresponding to the TD 110; associate a unique telepresence identification code with the TD 110 based on the order information 228, the unique telepresence identification code corresponding to a TSP 238 and one or more communications settings 227 of the TSP 238; and configure the TD 110 to: attempt to retrieve 408, through a network (e.g., 243, 244), the one or more communications settings 227 of the TSP 238 from one or more provisioning servers 219 based on the unique telepresence identification code and the serial number of the TD 110, when the TD 110 is coupled to the network (e.g., 243, 244); install the one or more communications settings 227 of the TSP 238 when retrieved 408 from the one or more provisioning servers 219; and attempt to communicate 248 with the TSP 238, wherein attempting to communicate 248 with the TSP 238 comprises attempting to communicate 248 with the TSP 238 through the network (e.g., 243, 244) in accordance with the one or more communications settings 227 of the TSP 238, based on the media access control address of the TD 110.

5. The teleconferencing provisioning system of example 4, wherein the instructions further comprise instructions to configure the TD 110 to: determine that the attempt to retrieve 408 the one or more communications settings 227 of the TSP 238 from the one or more provisioning servers 219 based on the unique telepresence identification code and the serial number of the TD 110 has failed; render a prompt 406 using a display 407 of the TD 110 for a user 104 to provide the one or more communications settings 227 of the TSP 238; and install the one or more communications settings 227 of the TSP 238 when provided (e.g., 524, 612) by the user 104.

6. The teleconferencing provisioning system of example 4, wherein the instructions further comprise instructions to configure the TD 110 to: attempt to retrieve 408, based on the one or more communications settings 227 of the TSP 238, one or more additional settings 231 from the one or more provisioning servers 219 through the network (e.g., 243, 244), the one or more additional settings 231 corresponding to a teleconferencing endpoint 114 of the TD 110; and install the one or more additional settings 231, wherein attempting to communicate 248 with the TSP 238 further comprises attempting to communicate 248 with the TSP 238 through the network (e.g., 243, 244) in accordance with the one or more additional settings 231 corresponding to the teleconferencing endpoint 114 of the TD 110.

7. The teleconferencing provisioning system of example 6, wherein the instructions to attempt to retrieve 408 the one or more additional settings 231 from the one or more provisioning servers 219 through the network (e.g., 243, 244), based on the one or more communications settings 227 of the TSP 238, comprise instructions to: retrieve 408 the one or more additional settings 231 from the one or more provisioning servers 219 through the network (e.g., 243, 244) based on one or more of a domain name, a server address, a server type, and authentication information corresponding to the one or more additional settings 231.

8. The teleconferencing provisioning system of example 6, wherein the instructions to attempt to retrieve 408 the one or more additional settings 231 from the one or more provisioning servers 219 through the network (e.g., 243, 244), based on the one or more communications settings 227 of the TSP 238, comprise instructions to: attempt to retrieve 408 one or more of a room name associated with the teleconferencing endpoint 114, sleep settings, language settings, and resolution settings of a display 407 corresponding to the teleconferencing endpoint 114.

9. The teleconferencing provisioning system of example 6, wherein the instructions further comprise instructions to: determine that the attempt to retrieve 408 the one or more additional settings 231 corresponding to the teleconferencing endpoint 114 of the TD 110 has failed; render a prompt 406 using a display 407 of the TD 110 for a user 104 to provide the one or more additional settings 231 corresponding to the teleconferencing endpoint 114 of the TD 110; and install the additional settings 231 corresponding to the teleconferencing endpoint 114 of the TD 110 when provided (e.g., 524, 612) by the user 104.

10. The teleconferencing provisioning system of example 4, wherein the instructions to attempt to communicate 248 with the TSP 238 comprise instructions to: attempt to establish a local teleconferencing network 318 with one or more other TDs 110, wherein each of the one or more other TDs 110 is associated with a different unique telepresence identification code of the TSP 238.

11. A method of provisioning teleconferencing endpoints 114, comprising: providing a first teleconferencing device (TD) 110; allocating a media access control address and a serial number to the first TD 110; receiving, at a first processor 204, an order (e.g., 106, 223) for the first TD 110; associating, based on the order (e.g., 106, 223), a unique telepresence identification code with the first TD 110, the unique telepresence identification code corresponding to a TSP 238 and one or more communication settings; configuring, using a second processor 204, the first TD 110 to interact with the TSP 238, wherein configuring the first TD 110 to interact with the TSP 238 comprises configuring the first TD 110 to: attempt to establish a channel 249 with the TSP 238 when the first TD 110 is coupled to a network (e.g., 243, 244); and communicate 248, when the channel 249 is established, with one or more second TDs 110 through a node of the TSP 238 in accordance with the one or more communication settings.

12. The method of example 11, wherein configuring the first TD 110 to interact with the TSP 238 further comprises configuring the first TD 110 to, when the channel 249 is established, attempt to establish a local teleconferencing network 318 with one or more other TDs 110, wherein each of the one or more other TDs 110 is associated with a unique telepresence identification code of the TSP 238.

13. The method of example 12, wherein the configuring the first TD 110 to, when the channel 249 is established, attempt to establish the local teleconferencing network 318 with one or more other TDs 110 further comprises configuring the first TD 110 to communicate 248 with the one or more other TDs 110 through a node 245 of the TSP 238.

14. The method of example 12, wherein configuring the first TD 110 to interact with the TSP 238 further comprises configuring the first TD 110 to: request, when the channel 249 is established, one or more additional communication settings 231 from the TSP 238; and communicate 248 with the one or more second TDs 110 through the node 245 of the TSP 238 in accordance with the one or more additional communication settings 231.

15. The method of example 12, wherein configuring the first TD 110 to interact with the TSP 238 further comprises configuring the first TD 110 to: wirelessly couple to a secondary input device 402; receive, from the secondary input device 402, a selection of at least one of the one or more communication settings; and initiate a teleconference with at least one other TD 110 in accordance with the selection of the at least one of the one or more communication settings.

16. The method of example 11, further comprising: receiving, at the first processor 204, a request to revise the order (e.g., 106, 223) for the first TD 110; disassociating, based on the request to revise the order (e.g., 106, 223), the unique telepresence identification code from the first TD 110; associating, based on the request to revise the order (e.g., 106, 223), an alternate unique telepresence identification code with the first TD 110, the alternate unique telepresence identification code corresponding to a different TSP 238 and one or more different communication settings; reconfiguring, using the second processor 204, the first TD 110 to interact with the different TSP 238, wherein configuring the first TD 110 to interact with the different TSP 238 comprises reconfiguring the first TD 110 to: attempt to establish a channel 249 with the different TSP 238 when the first TD 110 is coupled to the network (e.g., 243, 244); and communicate 248, when the channel 249 is established, with one or more second TDs 110 through a node 245 of the different TSP 238 in accordance with the one or more different communication settings.

17. The method of example 11, wherein the first processor 204 is the second processor 204.

18. A system for provisioning teleconferencing endpoints 114, comprising: a first processor 204 configured to: allocate a media access control address and a serial number to a first teleconferencing device (TD) 110; receive an order (e.g., 106, 223) for the first TD 110; and associate, based on the order (e.g., 106, 223), a unique telepresence identification code with the first TD 110, the unique telepresence identification code corresponding to a TSP 238 and one or more communication settings; and a second processor 204 configured to: configure the first TD 110 to interact with the TSP 238, wherein configuring the first TD 110 to interact with the TSP 238 comprises configuring the first TD 110 to: attempt to establish a channel 249 with the TSP 238 when the first TD 110 is coupled to a network (e.g., 243, 244); and communicate 248, when the channel 249 is established, with one or more second TDs 110 through a node 245 of the TSP 238 in accordance with the one or more communication settings.

19. The system of example 18, wherein configuring the first TD 110 to interact with the TSP 238 further comprises configuring the first TD 110 to, when the channel 249 is established, attempt to establish a local teleconferencing network 318 with one or more other TDs 110, wherein each of the one or more other TDs 110 is associated with a unique telepresence identification code of the TSP 238.

20. The system of example 19, wherein the configuring the first TD 110 to, when the channel 249 is established, attempt to establish the local teleconferencing network 318 with one or more other TDs 110 further comprises configuring the first TD 110 to communicate 248 with the one or more other TDs 110 through a node 245 of the TSP 238.

21. The system of example 19, wherein configuring the first TD 110 to interact with the TSP 238 further comprises configuring the first TD 110 to: request, when the channel 249 is established, one or more additional communication settings 231 from the TSP 238; and communicate 248 with the one or more second TDs 110 through the node 245 of the TSP 238 in accordance with the one or more additional communication settings 231.

22. The system of example 19, wherein configuring the first TD 110 to interact with the TSP 238 further comprises configuring the first TD 110 to: wirelessly couple to a secondary input device 402; receive, from the secondary input device 402, a selection of at least one of the one or more communication settings; and initiate a teleconference with at least one other TD 110 in accordance with the selection of at least one of the one or more communication settings.

23. The system of example 18, wherein the first processor 204 is further configured to: receive a request to revise the order (e.g., 106, 223) for the first TD 110; disassociate, based on the request to revise the order (e.g., 106, 223), the unique telepresence identification code from the first TD 110; associate, based on the request to revise the order (e.g., 106, 223), an alternate unique telepresence identification code with the first TD 110, the alternate unique telepresence identification code corresponding to a different TSP 238 and one or more different communication settings; and wherein the second processor 204 is further configured to configure the first TD 110 to interact with the different TSP 238, wherein configuring the first TD 110 to interact with the different TSP 238 comprises reconfiguring the first TD 110 to: attempt to establish a channel 249 with the different TSP 238 when the first TD 110 is coupled to the network (e.g., 243, 244); and communicate 248, when the channel 249 is established, with one or more second TDs 110 through a node 245 of the different TSP 238 in accordance with the one or more different communication settings.

24. The system of example 18, wherein the first processor 204 is different from second processor 204.

25. A non-transitory computer readable medium storing instructions executable by one or more processors 204, wherein the instructions comprise instructions to: allocate a media access control address and a serial number to a first teleconferencing device (TD); receive an order (e.g., 106, 223) for the first TD 110; associate, based on the order (e.g., 106, 223), a unique telepresence identification code with the first TD 110, the unique telepresence identification code corresponding to a TSP 238 and one or more communication settings; configure the first TD 110 to interact with the TSP 238, wherein configuring the first TD 110 to interact with the TSP 238 comprises configuring the first TD 110 to: attempt to establish a channel 249 with the TSP 238 when the first TD 110 is coupled to a network (e.g., 243,244); and communicate 248, when the channel 249 is established, with one or more second TDs 110 through a node 245 of the TSP 238 in accordance with the one or more communication settings.

26. The non-transitory computer readable medium of example 25, wherein the instructions to configure the first TD 110 to interact with the TSP 238 further comprise instructions to: configure the first TD 110 to, when the channel 249 is established, attempt to establish a local teleconferencing network 318 with one or more other TDs 110, wherein each of the one or more other TDs 110 is associated with a unique telepresence identification code of the TSP 238.

27. The non-transitory computer readable medium of example 26, wherein the instructions to configure the first TD 110 to, when the channel 249 is established, attempt to establish the local teleconferencing network 318 with one or more other TDs 110 further instructions to: configure the first TD 110 to communicate 248 with the one or more other TDs 110 through a node 245 of the TSP 238.

28. The non-transitory computer readable medium of example 26, wherein the instructions to configure the first TD 110 to interact with the TSP 238 further comprise instructions to configure the first TD 110 to: request, when the channel 249 is established, one or more additional communication settings 231 from the TSP 238; and communicate 248 with the one or more second TDs 110 through the node 245 of the TSP 238 in accordance with the one or more additional communication settings 231.

29. The non-transitory computer readable medium of example 26, wherein the instructions to configure the first TD 110 to interact with the TSP 238 further comprise instructions to configure the first TD 110 to: wirelessly couple to a secondary input device 402; receive, from the secondary input device 402, a selection of at least one of the one or more communication settings; and initiate a teleconference with at least one other TD 110 in accordance with the selection of at least one of the one or more communication settings.

30. The non-transitory computer readable medium of example 25, wherein the instructions further comprise instructions: receive a request to revise the order (e.g., 106, 223) for the first TD 110; disassociate, based on the request to revise the order (e.g., 106, 223), the unique telepresence identification code from the first TD 110; associate, based on the request to revise the order (e.g., 106, 223), an alternate unique telepresence identification code with the first TD 110, the alternate unique telepresence identification code corresponding to a different TSP 238 and one or more different communication settings; and configure the first TD 110 to interact with the different TSP 238, wherein configuring the first TD 110 to interact with the different TSP 238 comprises reconfiguring the first TD 110 to: attempt to establish a channel 249 with the different TSP 238 when the first TD 110 is coupled to the network (e.g., 243, 244); and communicate 248, when the channel 249 is established, with one or more second TDs 110 through a node 245 of the different TSP 238 in accordance with the one or more different communication settings.

The various examples set forth are provided by way of illustration and should not be construed to limit the scope of the disclosure. Various modifications and changes can be made to the principles and examples described herein without departing from the scope of the disclosure and without departing from the claims which follow.

It is claimed:

1. A method of provisioning teleconferencing endpoints, comprising:
  providing a teleconferencing device;
  allocating a media access control address and a serial number to the teleconferencing device;
  receiving, at one or more processors, purchase order information corresponding to the teleconferencing device;
  associating, using the one or more processors, a unique telepresence identification code with the teleconferencing device based on the purchase order information, the unique telepresence identification code corresponding to a teleconferencing service provider and one or more communications settings of the teleconferencing service provider; and
  configuring, using the one or more processors, the teleconferencing device to:
  attempt to retrieve, through a network, the one or more communications settings of the teleconferencing service provider from one or more provisioning servers based on the unique telepresence identification code and the serial number of the teleconferencing device, when the teleconferencing device is coupled to the network;

install the one or more communications settings of the teleconferencing service provider when retrieved from the one or more provisioning servers;

attempt to communicate with the teleconferencing service provider, wherein attempting to communicate with the teleconferencing service provider comprises attempting to communicate with the teleconferencing service provider through the network in accordance with the one or more communications settings of the teleconferencing service provider, based on the media access control address of the teleconferencing device; and attempt to retrieve, based on the one or more communications settings of the teleconferencing service provider, one or more additional settings from the one or more provisioning servers through the network, the one or more additional settings corresponding to a designated teleconferencing endpoint of the teleconferencing device, wherein the one or more additional settings corresponding to the designated teleconferencing endpoint of the teleconferencing device comprise of a room name associated with the designated teleconferencing endpoint, and sleep settings and language settings of a display corresponding to the designated teleconferencing endpoint.

2. The method of claim 1, further comprising configuring the teleconferencing device to:

determine that the attempt to retrieve the one or more communications settings of the teleconferencing service provider from the one or more provisioning servers based on the unique telepresence identification code and the serial number of the teleconferencing device has failed;

render a prompt using a display of the teleconferencing device for a user to provide the one or more communications settings of the teleconferencing service provider; and install the one or more communications settings of the teleconferencing service provider when provided by the user.

3. The method of claim 1, further comprising configuring the teleconferencing device to:

install the one or more additional settings, wherein attempting to communicate with the teleconferencing service provider further comprises attempting to communicate with the teleconferencing service provider through the network in accordance with the one or more additional settings corresponding to the designated teleconferencing endpoint of the teleconferencing device.

4. The method of claim 3, wherein the one or more communications settings of the teleconferencing service provider comprise one or more of a domain name, a server address, a server type, and authentication information corresponding to the one or more additional settings.

5. The method of claim 3, wherein the one or more additional settings corresponding to the designated teleconferencing endpoint of the teleconferencing device further comprise resolution settings of the display corresponding to the designated teleconferencing endpoint.

6. The method of claim 5, wherein the display is a component of the teleconferencing device.

7. The method of claim 3, further comprising configuring the teleconferencing device to:

determine that the attempt to retrieve the one or more additional settings corresponding to the designated teleconferencing endpoint of the teleconferencing device has failed;

render a prompt using a display of the teleconferencing device for a user to provide the one or more additional settings corresponding to the designated teleconferencing endpoint of the teleconferencing device; and install the additional settings corresponding to the designated teleconferencing endpoint of the teleconferencing device when provided by the user.

8. The method of claim 7, further comprising configuring the teleconferencing device to:

wirelessly couple to a secondary input device;

receive, from the secondary input device, a selection of at least one communications setting from among the one or more communications settings; and initiate a teleconference with at least one other teleconferencing device in accordance with the selection of the at least one communications setting.

9. The method of claim 1, wherein attempting to communicate with the teleconferencing service provider further comprises attempting to establish a local teleconferencing network with one or more other teleconferencing devices, wherein each of the one or more other teleconferencing devices is associated with a different unique telepresence identification code of the teleconferencing service provider.

10. The method of claim 1, further comprising:

receiving, at the one or more processors, a request to revise the purchase order information corresponding to the teleconferencing device;

disassociating, using the one or more processors, the unique telepresence identification code from the teleconferencing device, responsive to the request to revise the purchase order information; and associating, using the one or more processors, an alternate unique telepresence identification code with the teleconferencing device, the alternate unique telepresence identification code corresponding to a different teleconferencing service provider and one or more different communications settings.

11. A teleconferencing device having a media access control address, wherein the teleconferencing device is configured to: attempt to retrieve, through a network, one or more communications settings of a teleconferencing service provider from one or more provisioning servers based on a unique telepresence identification code and a serial number assigned to the teleconferencing device based on a purchase order, when the teleconferencing device is coupled to the network; install the one or more communications settings of the teleconferencing service provider when retrieved from the one or more provisioning servers; and attempt to communicate with the teleconferencing service provider, wherein attempting to communicate with the teleconferencing service provider comprises attempting to communicate with the teleconferencing service provider through the network in accordance with the one or more communications settings of the teleconferencing service provider, based on the media access control address; and attempt to retrieve, based on the one or more communications settings of the teleconferencing service provider, one or more additional settings from the one or more provisioning servers through the network, the one or more additional settings corresponding to a designated teleconferencing endpoint of the teleconferencing device, wherein the one or more additional settings corresponding to the designated teleconferencing endpoint of the teleconferencing device comprise of a room name associated with the designated teleconferencing endpoint, and sleep settings and language settings of a display corresponding to the designated teleconferencing endpoint.

12. The teleconferencing device of claim 11, wherein the teleconferencing device is further configured to:
   determine that the attempt to retrieve the one or more communications settings of the teleconferencing service provider from the one or more provisioning servers based on the unique telepresence identification code and the serial number of the teleconferencing device has failed;
   render a prompt using a display of the teleconferencing device for a user to provide the one or more communications settings of the teleconferencing service provider; and
   install the one or more communications settings of the teleconferencing service provider when provided by the user.

13. The teleconferencing device of claim 11, wherein the teleconferencing device is further configured to:
   attempt to retrieve, based on the one or more communications settings of the teleconferencing service provider, one or more additional settings from the one or more provisioning servers through the network, the one or more additional settings corresponding to a teleconferencing endpoint of the teleconferencing device; and
   install the one or more additional settings,
   wherein attempting to communicate with the teleconferencing service provider further comprises attempting to communicate with the teleconferencing service provider through the network in accordance with the one or more additional settings corresponding to the teleconferencing endpoint of the teleconferencing device.

14. A teleconferencing provisioning system comprising one or more processors and at least one memory storing instructions executable by the one or more processors, wherein the instructions comprise instructions to: allocate a media access control address and a serial number to a teleconferencing device; receive purchase order information corresponding to the teleconferencing device; associate a unique telepresence identification code with the teleconferencing device based on the purchase order information, the unique telepresence identification code corresponding to a teleconferencing service provider and one or more communications settings of the teleconferencing service provider; and configure the teleconferencing device to: attempt to retrieve, through a network, the one or more communications settings of the teleconferencing service provider from one or more provisioning servers based on the unique telepresence identification code and the serial number of the teleconferencing device, when the teleconferencing device is coupled to the network; install the one or more communications settings of the teleconferencing service provider when retrieved from the one or more provisioning servers; and attempt to communicate with the teleconferencing service provider, wherein attempting to communicate with the teleconferencing service provider comprises attempting to communicate with the teleconferencing service provider through the network in accordance with the one or more communications settings of the teleconferencing service provider, based on the media access control address of the teleconferencing device; and
   attempt to retrieve, based on the one or more communications settings of the teleconferencing service provider, one or more additional settings from the one or more provisioning servers through the network, the one or more additional settings corresponding to a designated teleconferencing endpoint of the teleconferencing device,
   wherein the one or more additional settings corresponding to the designated teleconferencing endpoint of the teleconferencing device comprise of a room name associated with the designated teleconferencing endpoint, and sleep settings and language settings of a display corresponding to the designated teleconferencing endpoint.

15. The teleconferencing provisioning system of claim 14, wherein the instructions further comprise instructions to configure the teleconferencing device to:
   determine that the attempt to retrieve the one or more communications settings of the teleconferencing service provider from the one or more provisioning servers based on the unique telepresence identification code and the serial number of the teleconferencing device has failed;
   render a prompt using a display of the teleconferencing device for a user to provide the one or more communications settings of the teleconferencing service provider; and
   install the one or more communications settings of the teleconferencing service provider when provided by the user.

16. The teleconferencing provisioning system of claim 14, wherein the instructions further comprise instructions to configure the teleconferencing device to:
   attempt to retrieve, based on the one or more communications settings of the teleconferencing service provider, one or more additional settings from the one or more provisioning servers through the network, the one or more additional settings corresponding to a specified teleconferencing endpoint of the teleconferencing device; and
   install the one or more additional settings,
   wherein attempting to communicate with the teleconferencing service provider further comprises attempting to communicate with the teleconferencing service provider through the network in accordance with the one or more additional settings corresponding to the specified teleconferencing endpoint of the teleconferencing device.

17. The teleconferencing provisioning system of claim 16, wherein the instructions to attempt to retrieve the one or more additional settings from the one or more provisioning servers through the network, based on the one or more communications settings of the teleconferencing service provider, comprise instructions to:
   retrieve the one or more additional settings from the one or more provisioning servers through the network based on one or more of a domain name, a server address, a server type, and authentication information corresponding to the one or more additional settings.

18. The teleconferencing provisioning system of claim 16, wherein the instructions to attempt to retrieve the one or more additional settings from the one or more provisioning servers through the network, based on the one or more communications settings of the teleconferencing service provider, comprise instructions to:
   attempt to retrieve one or more of a room name associated with the specified teleconferencing endpoint, sleep settings, language settings, and resolution settings of a display corresponding to the specified teleconferencing endpoint.

19. The teleconferencing provisioning system of claim 16, wherein the instructions further comprise instructions to:
 determine that the attempt to retrieve the one or more additional settings corresponding to the specified teleconferencing endpoint of the teleconferencing device has failed;
 render a prompt using a display of the teleconferencing device for a user to provide the one or more additional settings corresponding to the specified teleconferencing endpoint of the teleconferencing device; and
 install the additional settings corresponding to the specified teleconferencing endpoint of the teleconferencing device when provided by the user.

20. The teleconferencing provisioning system of claim 14, the instructions to attempt to communicate with the teleconferencing service provider comprise instructions to:
 attempt to establish a local teleconferencing network with one or more other teleconferencing devices, wherein each of the one or more other teleconferencing devices is associated with a different unique telepresence identification code of the teleconferencing service provider.

\* \* \* \* \*